United States Patent
Kosofsky et al.

[11] Patent Number: 6,068,003
[45] Date of Patent: *May 30, 2000

[54] METHOD AND APPARATUS FOR CLOSED-LOOP PRESSURE WASHING USING OZONATION

[75] Inventors: Howard B. Kosofsky, Menlo Park; Lawrence A. Shrieber, Woodside; Richard O. Rhodes, San Francisco; Michael D. Damron, San Jose; Eduardo M. Garcia, Belmont, all of Calif.

[73] Assignee: EZ Environmental Solutions Corporation, Menlo Park, Calif.

[ * ] Notice: This patent is subject to a terminal disclaimer.

[21] Appl. No.: 09/346,438

[22] Filed: Jul. 1, 1999

Related U.S. Application Data

[63] Continuation of application No. 09/144,691, Aug. 31, 1998, Pat. No. 5,935,341, which is a continuation of application No. 08/813,919, Mar. 7, 1997, Pat. No. 5,803,982, which is a continuation-in-part of application No. 08/732,638, Oct. 15, 1996, Pat. No. 5,785,067.

[51] Int. Cl.[7] .............................. B08B 3/02; B08B 13/00
[52] U.S. Cl. ......................................... 134/102.1; 134/111
[58] Field of Search .............................. 134/102.1, 102.2, 134/109, 111; 68/13 R; 261/DIG. 42; 210/167; 422/186.12

[56] References Cited

U.S. PATENT DOCUMENTS

| | | |
|---|---|---|
| 1,899,657 | 2/1933 | Zademach . |
| 1,916,806 | 7/1933 | Myrick . |
| 2,352,356 | 6/1944 | Albertson . |
| 2,646,059 | 7/1953 | Korns . |
| 2,788,954 | 4/1957 | Paasche . |
| 3,122,151 | 2/1964 | Chambers . |
| 3,224,914 | 12/1965 | Benton et al. . |
| 3,443,567 | 5/1969 | Moore . |
| 3,971,394 | 7/1976 | Osborne et al. . |
| 4,543,182 | 9/1985 | Gramse et al. . |
| 4,768,534 | 9/1988 | Anderson . |
| 4,818,388 | 4/1989 | Morioka et al. . |
| 5,033,489 | 7/1991 | Ferre et al. . |
| 5,082,558 | 1/1992 | Burris . |
| 5,181,399 | 1/1993 | Engel et al. . |
| 5,241,720 | 9/1993 | Engel et al. . |
| 5,313,811 | 5/1994 | Wasinger et al. . |
| 5,329,950 | 7/1994 | Barinas . |
| 5,499,643 | 3/1996 | Vincent, Jr. et al. . |
| 5,673,715 | 10/1997 | Carter .................................. 134/104.4 |
| 5,785,067 | 7/1998 | Kosofsky ............................ 134/102.1 |
| 5,803,982 | 9/1998 | Kosofsky et al. . |

*Primary Examiner*—Philip R. Coe
*Attorney, Agent, or Firm*—Beyer Weaver & Thomas, LLP

[57] ABSTRACT

A portable parts washer flows a washing agent over an object to remove any contaminants. The washing agent and contaminants flow into a basin mounted below the object. The washing agent is drawn from the basin and used to wash the object to provide a closed-loop system. A venturi-type injector mixes ozone from an ozone generator with the washing agent. A pump draws the washing agent from a first inlet to the basin, forces the washing agent through the injector, and returns the washing agent through a first outlet to the basin. Various splash protection mechanisms are used to protect an operator from any substances that may splash off of the object.

37 Claims, 16 Drawing Sheets

METHOD AND APPARATUS FOR CLOSED-LOOP PRESSURE WASHING USING OZONATION

This application is a continuation of co-pending application Ser. No. 09/144,691, filed Aug. 8, 1998, and now U.S. Pat. No. 5,935,341, which is a continuation of application Ser. No. 08/813,919, filed Mar. 7, 1997, and now U.S. Pat. No. 5,803,982, which is a continuation-in-part of application Ser. No. 08/732,638 filed Oct. 15, 1996, and now U.S. Pat. No. 5,785,067, of which is incorporated herein by reference in its entirety for all purposes.

BACKGROUND OF THE INVENTION

1. Field of Invention

The present invention relates generally to methods and apparatus for use in pressure washing. More particularly, the present invention relates to methods and apparatus for safely washing objects with a pressure washer and recovering contaminants from the objects.

2. Background

Contamination of the environment by man-made substances has been considered a serious problem for a long time. Recently, concern about contamination of earth, air and groundwater by oil, toxic chemicals and other hazardous wastes has expanded beyond large-scale industry to encompass the activities of many small businesses such as automobile service stations, and many others. Both government regulations and social outcry have placed tremendous pressure on these businesses to avoid discharging hazardous wastes into the environment in the course of ordinary business activities.

For example, in a service station, washing or steam-cleaning an automobile engine or auto parts often causes engine oil, gasoline, and other chemicals to enter a storm drain system, or other waterways which can lead to contamination of earth or groundwater. In addition, those who service remotely located equipment have a need to wash the equipment without discharging hazardous waste into the environment. For example, persons who service roof-mounted air conditioners containing lubricating petrochemicals, trapped pollutants or other chemicals are not permitted to wash the equipment in a manner that could cause chemicals to run off.

High pressure washing equipment is available, but in general, existing pressure washers have no containment capability for hazardous materials. They cannot prevent hazardous materials from entering the surrounding environment. Even if all the wash fluid is somehow recovered, hazardous wastes are not filtered out, so that these systems generate an enormous volume of wastewater which must be processed separately or placed in barrels for disposal.

Thus, there is a tremendous need now for a portable, zero-discharge wash apparatus which can recover oil, chemicals, and other hazardous materials from an object which is washed. In addition, there is a serious need for a wash apparatus which can recirculate and repeatedly filter the washing agent, producing a very small quantity of waste material, and for a wash apparatus which overcomes other disadvantages of the prior art, and provides other needed features, as for example splash protection for an equipment operator.

Known pressure washing equipment has other serious disadvantages. For example, such pressure washers are ordinarily connected to a public water supply having unknown average pressure and unknown instantaneous pressure. Fluctuations in pressure of the public supply could cause damage to the pressure washer or render it unable to produce consistently high output pressure. In addition, even when the public supply has consistent pressure, its pressure may be outside an ideal operational range for the pressure washer. Therefore, what is desired is a portable, self-contained way to conveniently and safely wash objects, e.g., automobile engines or parts, and recover contaminants from them by providing a controlled water supply to an adjustable pressure washer. Further, it is also desired to provide a pressure washer that reduces operator risk which can result from close contact with contaminants.

SUMMARY OF THE INVENTION

In one aspect, the invention is directed to an apparatus for washing an object having a contaminant and for recovering the contaminant. The apparatus flows a washing agent over the object to remove the contaminant, and receives the washing agent and contaminant in a basin mounted below the object. The washing agent is drawn from the basin to form a closed loop. The apparatus also has an ozone generator, a gas-liquid mixer connected to the ozone generator to inject ozone into the washing agent, and a first pump for drawing the washing agent from a first inlet to the basin, forcing the washing agent through the mixer, and returning the washing agent through a first outlet to the basin. The mixer may include a venturi-type injector.

In one embodiment, the apparatus for washing an object includes a cover arranged to deflect any washing agent which splashes against the object into the basin. In another embodiment, the object is supported on a turntable that is mounted over the basin.

Implementations of the invention may further include a basin which includes a plurality of baffle walls which define a circulation path between the inlet and the outlet. A contaminant separator may be positioned in the circulation path. The baffle walls may define a plurality of compartments, and the circulation path may include a plurality of gaps interconnecting the compartments. A second pump may draw the washing agent from a second inlet, force the washing agent through a filter, and circulate the washing agent through the circulation path. The second pump may return the washing agent through a second outlet to the basin, or it may flow the washing agent over the object and into the basin.

DETAILED DESCRIPTION OF THE EMBODIMENTS

Figure 1:
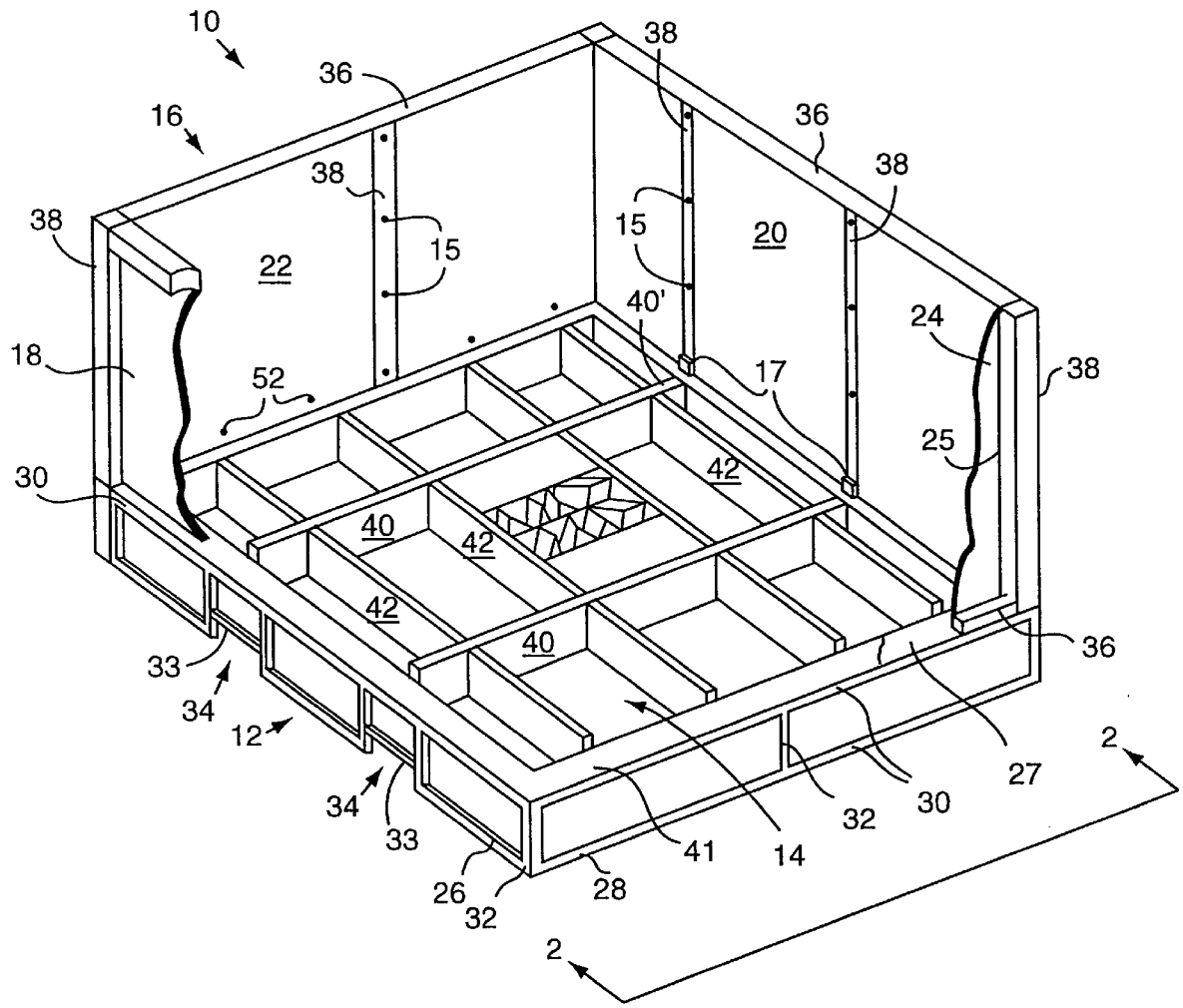
FIG. 1 is a perspective view of a washing apparatus in accordance with an embodiment of the present invention.
Figure 2:
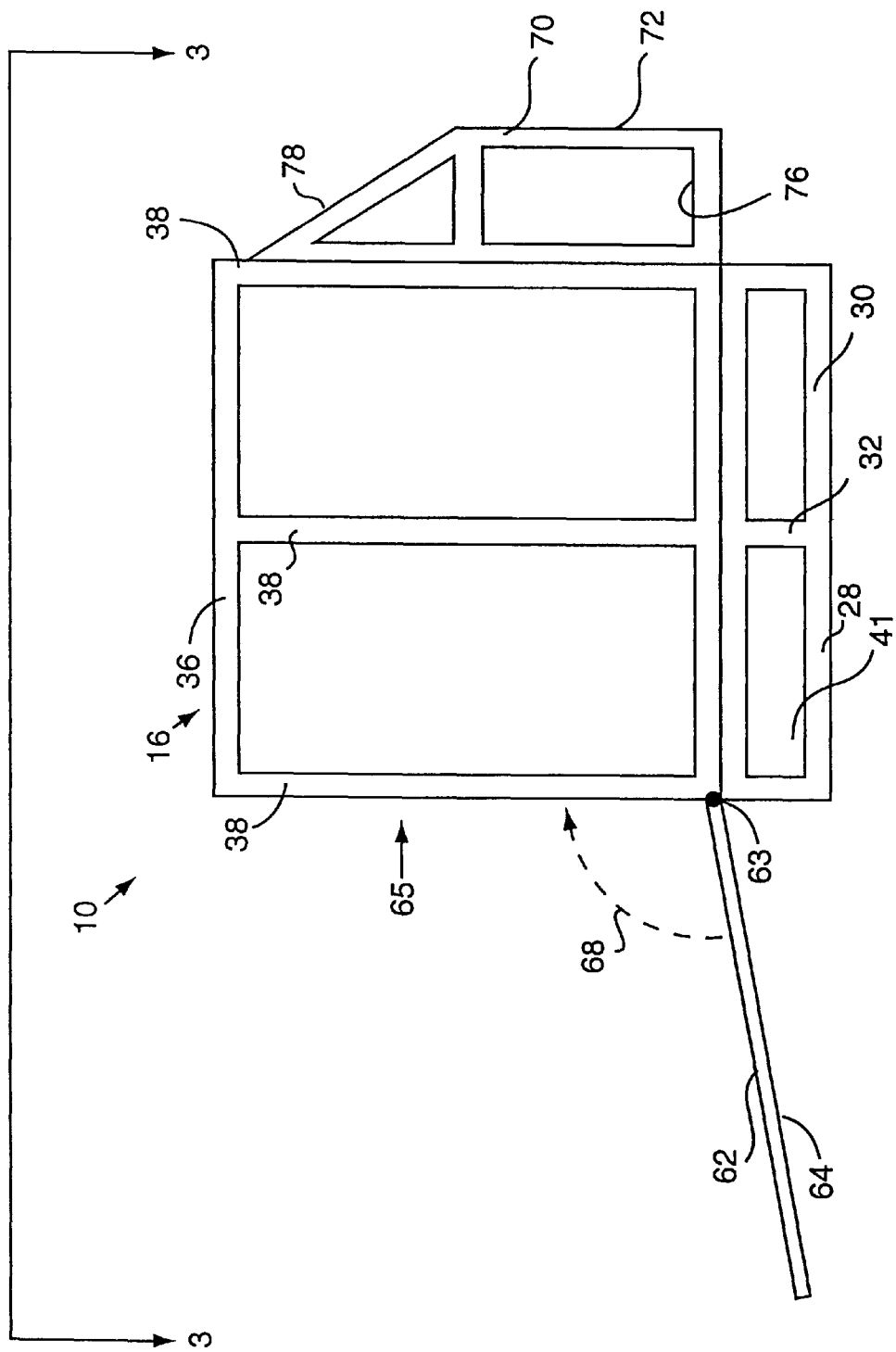
FIG. 2 is a side view of a washing apparatus in accordance with an embodiment of the present invention.
Figure 3:
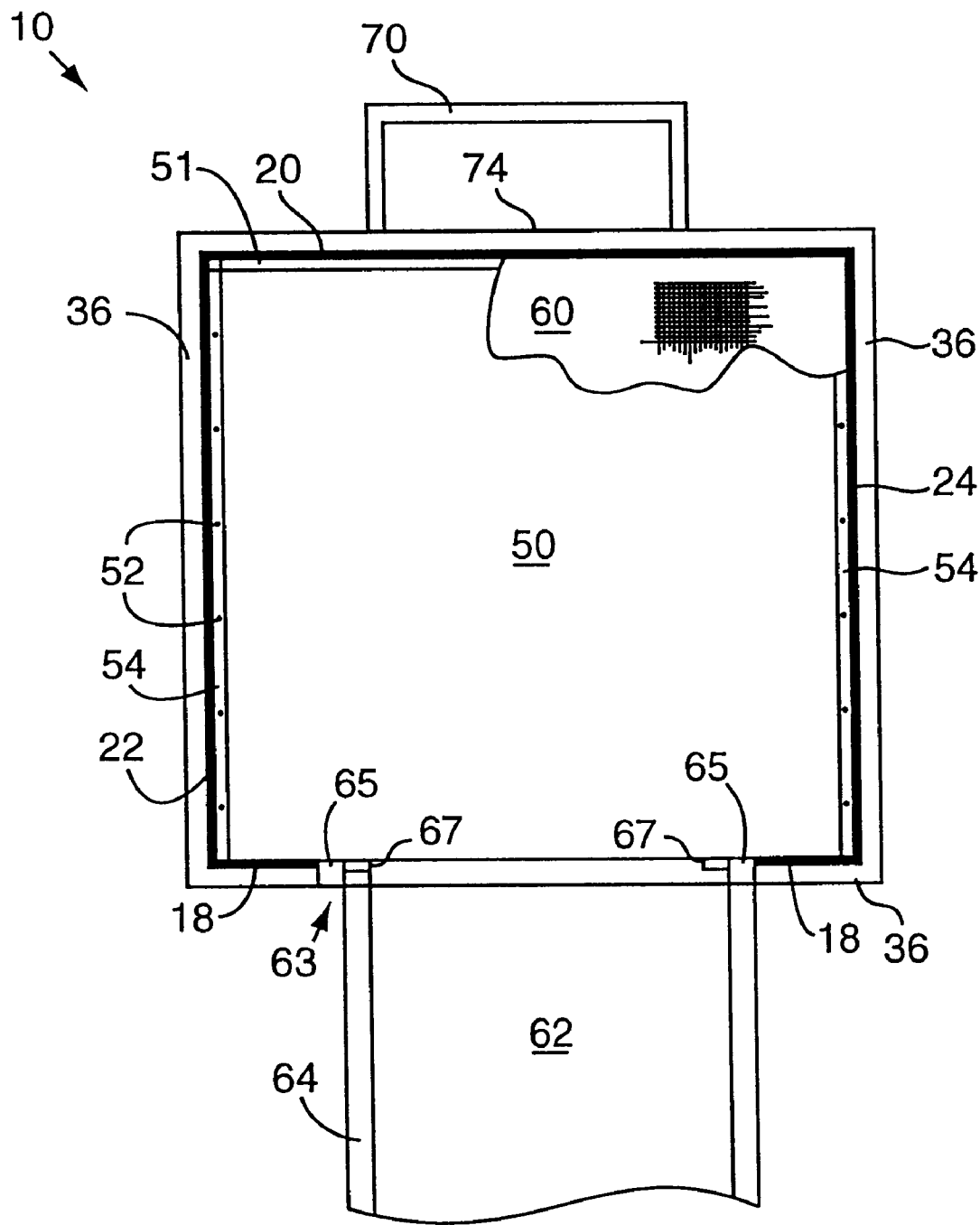
FIG. 3 is a top plan view of a washing apparatus in accordance with an embodiment of the present invention.

FIGS. 1, 2, and 3 show a pressure washing apparatus, or wash rack, 10 which includes a base frame 12, a containment tub 14, and a wall frame 16 in accordance with an embodiment of the present invention. Front and rear walls 18, 20 and left and right-side walls 22, 24 are affixed to the wall frame, thereby forming a rectangular enclosure into which an object is placed for washing. It should be appreciated that in FIG. 1, the front wall 18 and right wall 24 are shown in cutaway, in order to enable details of the tub to be shown.

The base frame 12 is a generally rectangular structure comprising four base side frames, although it should be appreciated that base frame 12 can take on any suitable shape. A front base side frame 26 and a right base side frame 28 are shown in FIG. 1; similar rear and left base side frames are also provided. Each of the base side frames is formed of horizontal beams 30 that are joined to vertical posts 32. The beams 30 and posts 20 can be welded aluminum tube stock, structural fiberglass (such as EXTREN® available from MMFG and its distributors), or any other lightweight, sturdy material which is non-conductive and non-corroding.

Although posts 32 can be of any suitable size, in the described embodiment, the posts 32 are about 9½" (20 cm) tall, so that the tub 14 is suspended and supported in the base side frames 26, 28. The front base side frame 26 has a pair of parallel, transverse fork pockets 34 which provide clearance for the forks of a forklift or a pallet jack, enabling the entire apparatus 10 to be easily moved to a job site or any desired location. A load-bearing brace 33 extends across each fork pocket 34; the braces 33 contact the forks of a fork lift or pallet jack and bear the weight of the apparatus. The rear base frame (not visible in FIG. 1) has vertical posts affixed across the fork pocket area to prevent a fork lift operator from attempting to insert the forks of a fork lift into the rear frame. The tub 14 has a pair of molded fork clearance channels extending rearwardly in alignment with the fork pockets 34 in order to clear the forks. The apparatus also can be lifted to an elevated location in this manner.

The wall frame 16 similarly comprises horizontal beams 36 and vertical posts 38 arranged in a rectangular upright structure. As shown in FIG. 1, the beams and posts forming the wall frame 16 are welded aluminum tube stock, structural fiberglass or other lightweight, strong material.

In one embodiment, the wall frame is made in detachable left, right, front and rear wall sections so that the frame can be collapsed into a stack for shipping atop the tub and base frame. The beams and posts have threaded fasteners for securing the wall sections to each other and to the base frame, to form a sealed enclosure which prevents contaminants washed off an object from entering the surrounding environment. Use of threaded fasteners also allows the apparatus to be disassembled into flat wall sections which can be stacked in compact fashion for shipment, permits one person to assemble the apparatus by eliminating nuts, and eliminates water leakage paths which would occur if through-bolt holes were used.

Gaskets 25 are secured to the wall posts and the base frame to ensure a tight seal between the base frame and the wall sections. The gaskets can be foam tape or other resilient material running the length of the posts and beams. Walls 18, 20, 22, and 24 are secured to the wall frame 16 with screws 15. The walls are HYZOD polycarbonate sheet or an equivalent material which is non-conductive and generally impervious to attack by oil, solvents, and other hazardous materials. The walls are about 40" (1 m) high, or any other height which adequately contains the spray of a washing agent within the walls, but also allows an operator to reach over or lean into the apparatus to wash an object. The walls are made sufficiently high to prevent an operator from falling out of the apparatus when working inside it. The walls are made of transparent material so that an operator can see through them to steer the apparatus when it is on a forklift, pallet jack or other moving equipment.

The tub 14 can be a molded high-density polypropylene basin, or an equivalent sealed pool or basin with high perimeter walls strong enough to contain water. Since the tub 14 itself cannot carry a heavy load placed on it, the tub 14 has a plurality of load-bearing longitudinal beams or walls 40 and a plurality of lateral beams or walls 42. A secondary containment tub can be provided either within or outside the tub 14 to provide extra security against spillage of hazardous materials.

Figure 4:
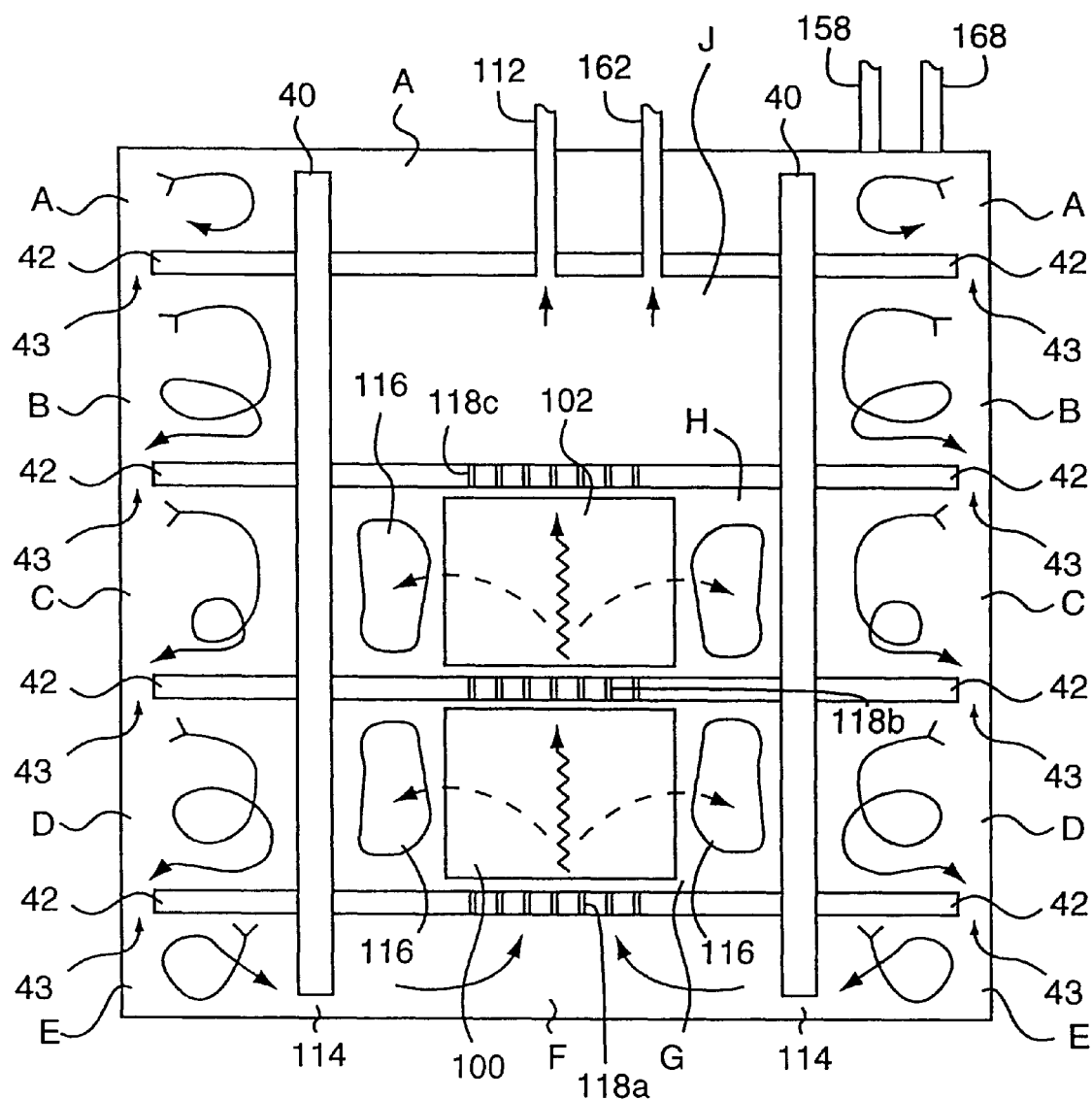
FIG. 4 is a top view of fluid flow paths in accordance with an embodiment of the present invention.

The beams 40, 42 snugly interlock so that fluid cannot cross the beams unless a hole is provided in the beam, thus subdividing the tub into a plurality of containment compartments designated A through J in FIG. 4. When an object is washed with a washing agent in the apparatus, the tub and its containment compartments receive the washing agent and any hazardous materials washed off the object. The tub has flanges 41 around its perimeter which extend over and rest on the beams 30 of the base frame. The lower beams 36 of the side walls rest on a tub gasket 27 and on the flanges, and are fastened to the beams 30 using threaded fasteners, forming a sealed sandwich which prevents release of contaminants.

The tub and supporting beams may comprise a modified containment system such as the CONTAIN-IT PLUS available from Containment Corporation, Los Alamitos, Calif., USA, or the type shown in Eckert U.S. Pat. No. 4,930,632 or 5,036,976. Such containment systems are intended for spill containment of palletized barrels of hazardous material, but not for use in a washing apparatus. This type of containment system is typically modified to be used in the apparatus of this disclosure, e.g., by adding inlets and outlets, by removing a downward, hanging lip on the perimeter of the tub, and by making other necessary changes described below. Also, the beams may be modified by making holes in the beams to permit water to flow between containment compartments. The holes, in one embodiment, can be arranged such that they are located at approximately the surface level of the fluid contained in the washing apparatus. By arranging the holes in the beams at the surface of the fluid, the flow of oil, which may be located at the surface of the fluid, is facilitated between compartments.

As shown in FIG. 3, a subfloor 50 rests atop the beams 40, 42. The subfloor is held spaced apart from at least some of the walls 18, 20, 22, 24 by a plurality of spacers 52 affixed to the lower inside face of the walls 18, 20, 22, 24. Thus, a narrow gap 54 of approximately ¾" (16 mm) in the described embodiment, is provided on three sides of the subfloor 50 to enable washing fluid and debris to flow into the tub 14. It should be appreciated that, in general, a narrow gap may be provided on any number of sides of the subfloor 50. The subfloor 50 rests flat on the beams 40, 42 to provide a solid walking surface, and to help reduce heat loss when the water is in a heated state.

A stabilizing bar 51 extends across the rear edge of the subfloor 50. The bar 51 transfers the weight of the apparatus to the cleats 17 when the apparatus is lifted. The tub has little compressive strength, whereas the beams 40, 42 and the frame can carry substantial weight. To aid in transferring the weight of the apparatus to the frame, a pair of cleats 17 are secured to the rear wall frame through the rear wall 20. When the apparatus is lifted, and when a heavy object is placed in the apparatus, weight is transferred from the beams to the bar 51 and then to the cleats. In particular, upward pressure by the rear ends 40' of the beams 40 is exerted on the cleats 17 and thereby is transferred to the rails 36, posts 38, and the base frame. In short, the cleats 17 effectively bear and transfer all the weight of the tub, the beams 40, 42, and any water in the tub to the frame.

The subfloor 50 is removable to provide access to the tub 14. The subfloor is a non-conductive, rigid material such as fiberglass or a composite material. A non-conductive, non-skid floor mat 60 lies on the subfloor 50 to slightly elevate the object being washed, and anyone standing in the apparatus, above the subfloor. This causes wash fluid to collect below the floor mat, preventing pooling and reducing spray reflection during pressure washing. Thus, the floor mat 60 helps prevent hazardous materials from splashing out of the apparatus and generally improves the safety of the operator. The floor mat may be made from FLEXMAT molded grating or an equivalent pliable, non-skid matting.

A ramp 62 is hinged to the base frame between the front walls 18. The ramp comprises a ramp wall 66 affixed to a welded frame of beams 64. Holes 63 ride on axles (not visible) protruding inwardly from posts 65, to enable hinged movement of the ramp 62. Other types of heavy duty hinges can be used. The ramp can be folded down, as shown in FIG. 2, to enable heavy objects to be rolled into the apparatus or to hand carry objects into the apparatus. As shown by arrow 68, before an object is washed, the ramp is moved upward and rests against flanges 67 protruding from posts 65 of the front wall frame 16 adjacent the front wall 18. The ramp 62 is held in place by two latches (not shown). The ramp 62 is covered with a subfloor and non-skid 10 grating like those used over the tub 14. It should be appreciated that ramp 62 can take many suitable forms. Another embodiment of a ramp will be described below with reference to FIG. 10.

Figure 5:
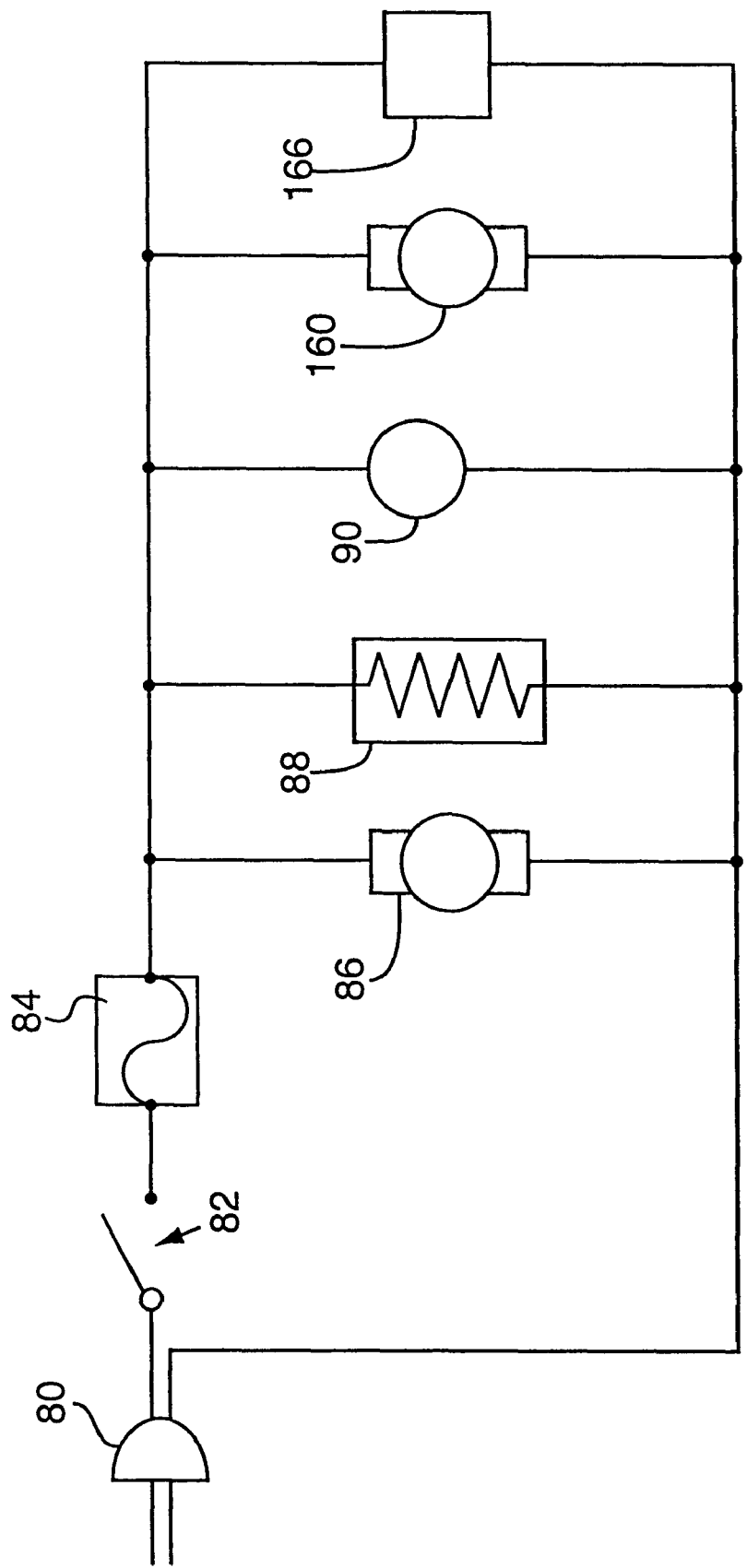
FIG. 5 is a schematic diagram of electric components in accordance with an embodiment of the present invention.
Figure 6:
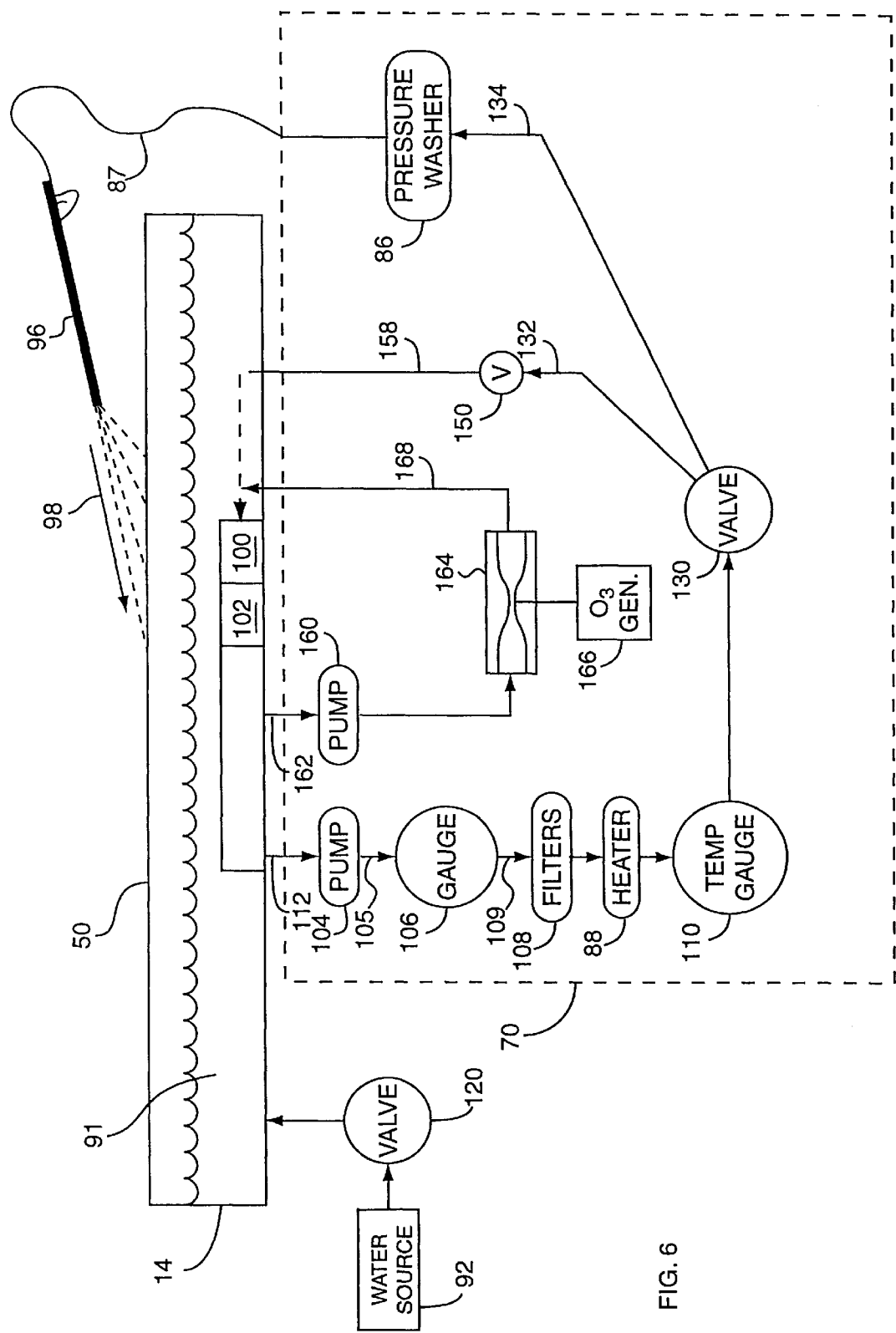
FIG. 6 is a schematic diagram of hydraulic components in accordance with an embodiment of the present invention.
Figure 7:
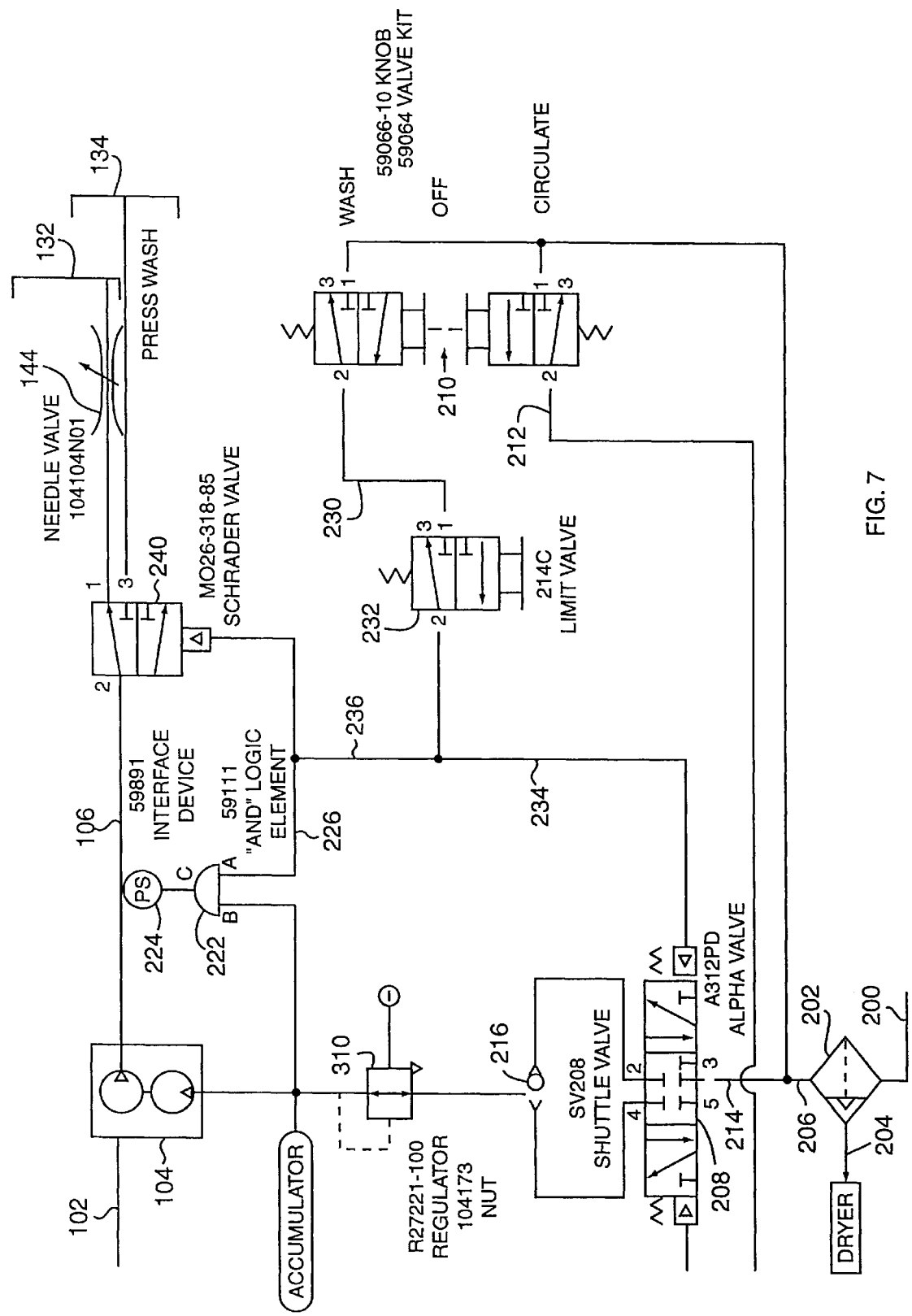
FIG. 7 is a schematic diagram of pneumatic components in accordance with an embodiment of the present invention.

A control unit 70 is attached to the rear wall frame, and encloses control equipment described below. The control unit 70 is removable and may be attached to an enclosure of any dimension suitable for a particular object to be washed. For example, the enclosure and tub may take the form of an elongated rectangle to accommodate a motorcycle. When the control unit is removed it can be stacked on the collapsed frame of the apparatus for compact shipment. The particular dimensions and structure of the control unit 70 are not critical, and it can be made using a frame 72 of aluminum tubing, fiberglass, or an equivalent. The control unit 70 has a rear wall 74 and a floor 76 to which the components shown in FIG. 5, 6, and 7 are mounted. These components need not be mounted in any particular place within the control unit 70. A control panel 78 provides a mounting surface for gauges, control knobs, and dials.

FIG. 6 shows a hydraulic system, that is, components and paths used to move water through the apparatus, in accordance with an embodiment of the present invention. In the description of this system, the term "water" is used to refer to a washing agent used to wash contaminants from an object. However, detergents or other suitable washing agents may be used. Therefore, the invention is not limited to water as a washing agent.

One embodiment of the mechanical flow of water through the tub is shown in FIG. 4, in which the arrows represent the direction of water flow. For clarity, in the following discussion, aspects of the invention shown in FIG. 4 and FIG. 6 are discussed together for clarity. Initially, the tub 14 is filled with water 91 to a pre-determined depth, such as about 7" (18 cm), to prime the system and ensure proper pump operation and proper filtration. The typical volume of water used to fill the tub 14 is approximately fifty-five gallons.

As described above, beams 40, 42 rest in the tub 14, and fit snugly against one another to form a plurality of dammed containment compartments A, B, C, D, E, F, G, H, J. As shown in FIG. 6, a pressure washer 86 provides a flow of high-pressure water through a hose 87 to a wand 96. The wand is swept over the object to be washed, causing water to cascade onto the subfloor 50, as indicated by arrow 98. In the described embodiment, the water generally only enters compartments A, B, C, D, E and F because the gaps in the subfloor are provided only at the sides and front of the subfloor. Also, in the described embodiment, water cannot flow laterally through beams 40 except through gaps 114 which lead to compartment F.

An inlet pipe 112 is provided at the rear of the tub and is coupled to a first ump 104 which draws water 91 from the tub 14 through the inlet pipe 112. The inlet pipe 112 has a pick-up screen covering its open end in the tub 14 to prevent large particles from entering the pump 104. In operation, the pump provides continuous suction through the inlet pipe 112. As a result, when an object is being washed, runoff water and contaminants (that is, a contaminated slurry flow) will initially enter compartments A, B, C, D, and E. In these compartments, the water tends to swirl around, as shown by the arrows, until it exits the compartment through gaps 43 at the ends of the beams 42. Each beam tends to act as a vertical weir to enhance breakdown of suspended solids, which fall to the bottom.

Eventually the water/contaminant slurry moves into compartment F through the gaps 114. Holes 118a in one of the beams permit suction from the pump 104 to draw the water from compartment F and through a first water/oil separator 100 in compartment G. A plurality of holes 118a are provided to conform to inlet points of the separator 100. As shown by the arrows in compartment G, the separator 100 permits cleaned slurry water to flow toward the outlet pipe 112, but oil and other contaminants rise to the surface of the separator 100 and are discharged to its sides, falling into a pair of capillary absorbent "socks" 116 or equivalent. The socks 116 absorb many times their weight in oil and other contaminants through capillary action. Heavy particles typically fall out of the separators 100 and settle to the floor of the tub 14. In one embodiment, filters can be used to collect heavy particles, as will be described below with respect to FIG. 9.

Suction from the pump further urges cleaned water exiting separator 100 to flow through holes 118b into a separator 102, in compartment H, in which the oil/water separation process is repeated. More oil or contaminants rise in the separator and are discharged into another pair of absorbent socks 116. Separated water flows through holes 118c into a clean water compartment J. Suction from the pump 104 draws the cleaned water from compartment J into inlet pipe 112. The inlet pipe 112 is mounted at a low position in the rear-most beam 42, so that any residual oil floats and is not drawn into the inlet pipe 112.

At this point, the cleaned water is drawn by the pump 104 and driven under pressure through a hose 105 to a pressure gauge 106 which can be mounted on the control panel 78. Thus, the gauge reads the output pressure of the pump 104. The water next flows through at least one filter 108 having an intake 109 and an outlet 111. More filters can be used to remove successively smaller particulates and molecules from the water. For example, filter 108 can comprise a 150 micron to 100 micron filter, series coupled to a 100 micron to 30 micron string-wound filter, series coupled to a 30 micron to 10 micron polypropylene filter. The filters can be arranged to perform coalescing filtration by routing unfiltered water into the center of the filter and drawing filtered water out the sides of the filter. The number of filters can be varied without affecting the scope of the invention. The filters may comprise string-wound or pleated cellulose or polypropylene filter cartridges such as those available from Met Pro Corporation, Keystone Filter Division, Hatfield, Pa. USA.

The difference in pressure displayed by a water gauge 106 and an air gauge (in the pneumatic system described below) represents the restriction imposed by the filters, and line friction in the water hoses, tub, and piping. Typically, the restriction will be about 15–20 PSI for clean filters, depending on the filtration capacity and type of filters. The gauges can be used to judge when the filters are dirty by observing a change in the pressure difference or restriction; when the restriction increases 810 PSI, the filters should be changed.

Filtered water exiting the filter outlet 111 is fed to a heater 88 which heats the water to a pre-determined temperature, such as 140–180 degrees F. Water at this temperature has markedly improved cleaning effectiveness. The heated water passes through a temperature gauge 110, such as a sight-glass type, which enables an operator to read the temperature of the heated water and also verify the clarity of the filtered water. Heating a loaded tub 14 of cold water can take several hours. Therefore, the apparatus can include a digital clock coupled to the apparatus for turning the entire apparatus on, in recirculation mode, to pre-heat the water starting several hours before an operator begins work with the apparatus.

Upon exiting the temperature gauge 110, the water arrives at a valve 130 having two output paths 132, 134. The valve 130 can be, for example, a three-way Schrader air-actuated valve. Under pneumatic control, as discussed below, the valve 130 may be set for output on a recirculating path 132 or a wash path 134. When the recirculating path 132 is selected, water flows back to the tub 14 for re-use. Specifically, the recirculation path 132 includes an outlet pipe 158 which connects the valve 130 to a compartment A in the tub 14. Thus, path 132 enables the apparatus to operate in a closed manner with zero discharge of filtered water. This ensures that any remaining toxins stay within the system and do not enter groundwater or a storm drain system. It also improves the efficiency of the separation process by forcing water to the beginning of the compartment circulation cycle. In addition, the recirculation path 132 returns filtered water to the tub for re-use, which greatly reduces the quantity of wastewater. The filtered water can be left in the tub with any residual contaminants. The contaminants may then be wiped or vacuumed out of the tub and disposed of, resulting in virtually zero wastewater discharge. Other containments are trapped in the capillary socks, which are disposable.

When the wash path 134 is selected, the valve 130 routes heated water to a second pump such as the pressure washer 86 which generates high-pressure water to a manually operated washing wand 96. A separate flow of detergent or washing chemicals can be routed through the wand.

Under certain conditions it is desirable to adjust the flow rate of water leaving the pump. For example, chemical washing agents or detergents in the apparatus may change the thermal conductivity or specific heat of the water, requiring reduced flow through the heater to heat the water sufficiently. Therefore, a manually adjusted flow control valve 150 is provided to regulate the flow rate of the water after it leaves the pump.

The washing apparatus may also include an ozonation system to ozonate the water in the tub 14. The ozonation system includes a recirculation pump 160 which draws water from clean-water compartment J into an inlet pipe 162. Typical operation parameters for the recirculation pump 160 are a flow rate of about six gallons per minute and a pressure of about fifteen pounds per square inch (p.s.i.). From the recirculation pump, the water flows through a gas-liquid mixing device such as venturi-type injector 164. The injector 164 is connected to an ozone generator 166. As the water flows through the injector 164, an area of low pressure is created at the constriction of the venturi. The low pressure in the injector 164 draws ozone from the ozone generator 166, and mixes it with the water. The ozonated water is then returned via an outlet pipe 168 to one of compartments A in tub 14.

The ozone generator 166 operates by drawing oxygen from the atmosphere and subjecting the oxygen to ultraviolet radiation. The ozone generator 166 may be a model CS-1200 available from Clearwater Technologies capable of generating 0.25 grams of ozone per hour. Ozone is highly oxidizing, and will attack any contamination in the water. However, given the typical total volume of water in the tub, the ozone generation rate of 0.25 grams per hour will be sufficient to oxidize contaminants without damage to the components of the washing apparatus. Both ozone generator 166 and recirculation pump 160 may be activated any time that power to the washing apparatus is turned on. Because ozone has a half-life of twenty minutes, the recirculation mode is used to constantly replenish the ozone in the water. Because tub 14 has a typical volume of approximately fifty-five gallons, it takes approximately nine minutes for the water drawn through inlet pipe 162 to return to clean-water compartment J.

An external water source 92 such as a faucet or hose can be separately coupled to the tub 14 through a differential pressure valve 120, to provide fresh make-up water for replacement of tub water lost through evaporation. In this arrangement, the valve is submerged in the tub and senses water pressure above the valve. When the pressure decreases to a predetermined threshold which indicates a low water level, the valve opens, permitting make-up water to enter and fill the tub. This is helpful since use of heated water in the system increases the rate of water lost to the atmosphere through evaporation.

The number of separators and capillary socks can be varied depending on the level of contamination of the objects to be washed. Thus, the system can be tailored to match cleaning needs of a particular object or industry. The pump may comprise an ARO 66602x series ¼" port air-operated diaphragm pump available from ARO Fluid Products Division, Bryan, Ohio USA. An air-operated pump is advantageous to reduce the likelihood of igniting flammable contaminants, and to prevent electric shock. A diaphragm pump is advantageous because it has no impeller which can break. Some air-operated pumps also are groundable, which helps dissipate static electricity charges which may build up during washing.

The oil-water separators may comprise MPAK coalescing plate separators available from Facet International, Inc., Tulsa, Okla. USA. The absorbent socks may comprise SPILCAT capillary absorbents available from HYTEC Environmental Equipment, Walnut Creek, Calif. USA.

FIG. 5 shows electrical connections in accordance with an embodiment of the present invention. In general, the electrical system is minimized to reduce the potential for igniting combustible materials washed from an object and to reduce shock hazard. A plug 80 is coupled to a source of alternating current at 120 volts a.c. or 220 volts a.c. A main power switch 82 e nables disconnection of the power. Preferably the circuit is protected by a high-current (80 ampere) ground fault circuit interrupter 84 such as Leviton Cat. No. 6895. At least five devices are connected across the voltage source. An electric pressure washer 86 uses the a.c. current to generate a high-pressure stream of fluid, such as water, from a low-pressure input stream. The heater 88 heats the fluid to improve washing effectiveness. The heater 88 may comprise a 3000-watt hot tub/spa heater such as model HTTR, HTHX, or STX available from Vulcan Electric Co., Kezar Falls, Me. USA. An hour usage counter 90 enables a n operator to monitor the amount of time for which the apparatus has been used. Both ozone generator 166 and recirculation pump 160 are connected across the voltage source so that they are both activated any time that main power switch 82 is closed.

When the tub 14 contains a large volume of cold water, heating the entire volume to a temperature sufficient for improved cleaning may take several hours. The water can be pre-heated automatically, before an operator arrives for a work session, with a programmable clock. A suitable clock is the type used to control spa heaters, such as those made by BRK Industries, within a 30-amp current switching load, and an override feature. The clock comprises a digital clock module coupled to a solenoid-driven air valve, which, in one embodiment, is connected in series with the air pressure source 200 shown in FIG. 7. The current time of day is preset, and the desired start time is preset on the clock. At the preset time, the clock causes the solenoid to open the valve. The system is left in circulate mode while the clock is running. Thus, when the preset time arrives, the clock will open the valve and permit air to activate the system, turning on water circulation and the heater.

The apparatus is controlled using a pneumatic control and signaling system as shown in FIG. 7 in accordance with an embodiment of the present invention. Pneumatic signaling is superior to an electrical system because it is simpler, offers greater fire safety, and reduces the risk of electric shock. The latter advantage is important because the entire apparatus, including the control unit 70, may get wet during the washing process.

An air pressure source 200 feeds the system, preferably at about 40 PSI to 100 PSI, from an external compressor or compressed gas bottle. Air is coupled to a quick-disconnect coupling 202. One branch of the coupling feeds an external dryer wand. The wand may be used to blow-dry the washed object. The other branch 206 of the coupling 202 is coupled to an alpha valve 208 and to a rotary control valve 210. The control valve 210 has three settings: off, wash, and circulate. In the off setting, air is disconnected and the system does not operate. In the circulate setting, the system will circulate water, but the pressure washer does not operate, so objects cannot be washed. In the wash setting, only the pressure washer operates.

When the control valve 210 is in the circulate setting, the control valve routes an air signal 212 to the alpha valve 208, which opens, permitting air to flow on path from path 214 to a shuttle valve 216. Air then enters a flow regulator 310. The regulator 310 may be manually adjusted to vary air pressure downstream from the regulator 310 which drives the pump 104. The pump 104 outputs water at the same pressure as the input air pressure. Thus, by adjusting the regulator 310, an operator can change the water flow rate of the pump 104.

Air exiting the regulator 310 is also coupled to an AND logic device 222, As described above in connection with FIG. 6, the pump 104 receives input water from the tub 14 through pipe 112, and passes water out on line 105. A pressure sensor 224 is coupled to the AND device 222, and is located adjacent to the water line 105. The AND device turns ON only when sufficient air pressure in line 226 is sensed by the pressure sensor. This acts as a safety mechanism, keeping the air pump 104 from running with zero or insufficient air pressure, and thus preventing the apparatus from feeding a "dry line" to the pressure washer 86. After exiting the AND device, air is fed to the Schrader valve 240. Thus, when the control valve 210 is in the recirculate position, and sufficient water pressure exists in line 105, the Schrader valve moves, causing water to pass from line 105 through a needle valve 144 to the recirculation path 132.

When the control valve 210 is in the wash position, an air signal is fed on line 230 to a limit valve 232. The limit valve 232 is mounted adjacent to the ramp 62; if the ramp is closed, the limit valve feeds air to the alpha valve 208, which then opens. 20 This prevents an operator from washing a contaminated object until the ramp is up and the object is fully contained by the apparatus. The limit valve also feeds air on line 236 to the AND logic element 222 and to the Schrader valve 240. When the Schrader valve is activated, it permits a flow of water to enter the pressure washer via wash path 134. Thus, when the control valve is in the wash position, and the ramp is closed, the pneumatic system activates the pressure washer. The limit valve 232 does not shut off the air signal 212 when the control valve 210 is in the circulate position; thus, water can circulate in the tub when the ramp is down, because this does not pose a safety risk to the operator or the environment.

Figure 8:
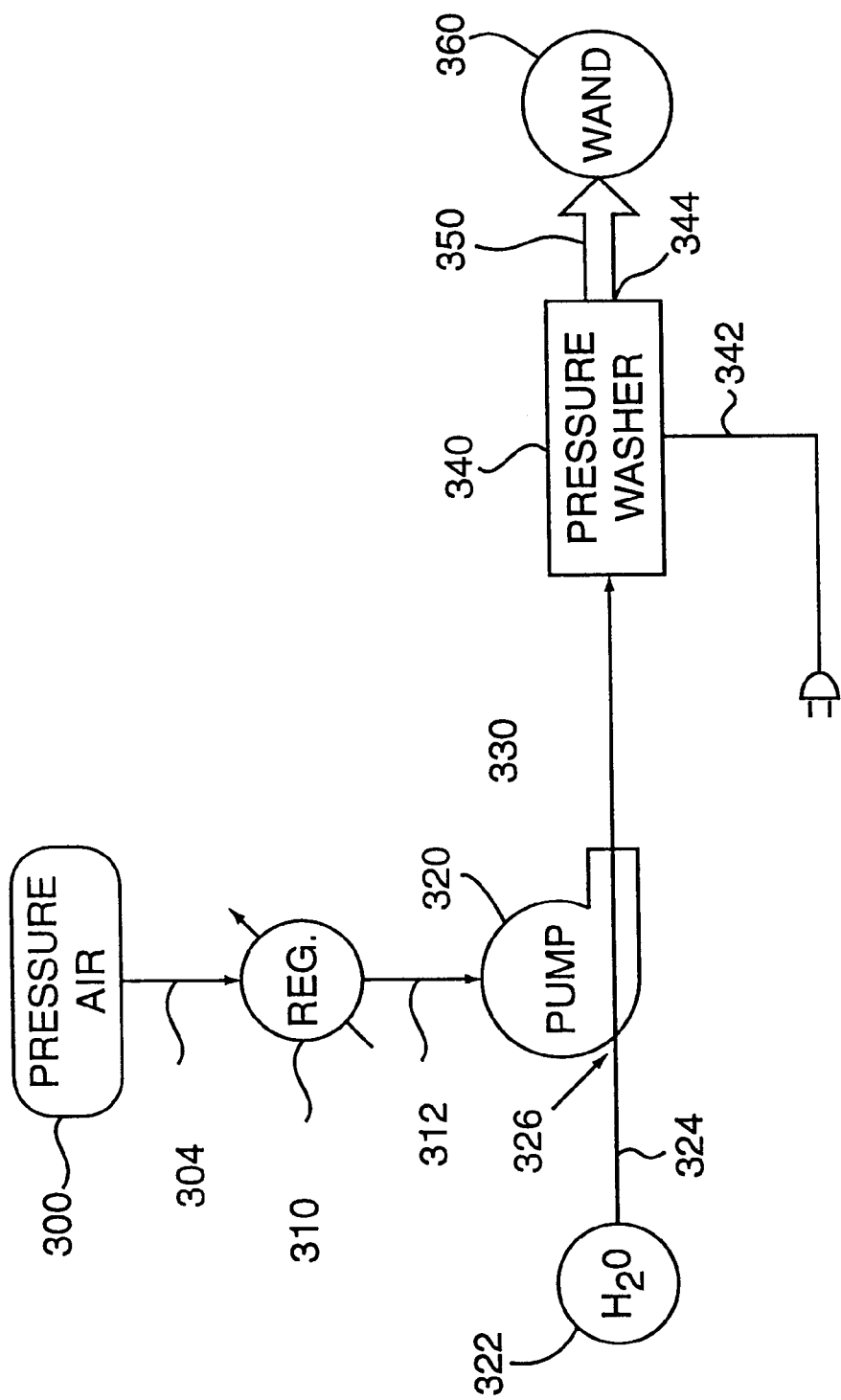
FIG. 8 is a block diagram of a method of optimizing performance of a fluid pump in accordance with an embodiment of the present invention.

The apparatus described above incorporates a significant advance in the art of pump performance. FIG. 8 shows a method of optimizing the performance of a fluid pump 340 such as a pressure washer in accordance with an embodiment of the present invention. A source of a first fluid under pressure 300 is provided, which may comprise an air compressor, air from a compressed-gas bottle, or the equivalent. Generally the pressure of the fluid source 300 is about 40 pounds per square inch (PSI) to 100 PSI. The pressurized fluid is coupled on a supply line 304 to a regulator 310, such as a manual dial-operated air regulator. The regulator 310 provides air at manually-variable pressure on an output line 312.

The output line 312 is coupled to a second pump 320 which drives a second fluid. The second pump 320 has a supply port 326 for receiving a flow of a second fluid, such as a water supply 322, on a supply line 324. The second fluid is impelled through the second pump and exits through an output port 328 at higher pressure. The second pump can be, for example, an air-operated diaphragm-type pump. This type of pump requires no electricity, so it is safe for use in pumping flammable fluids. The output water pressure of a diaphragm pump is determined by the magnitude of the input air pressure.

The higher pressure output port 328 is coupled on a fluid line 330 to the input port 332 of the fluid pump 340. The fluid pump may be, for example, a pressure washer, which is essentially a high-performance electric water pump. An external electricity supply is provided to the fluid pump 340 by a line cord 342, and powers an electric motor in the fluid pump. The fluid pump produces a high-pressure output stream 350 through a pressurized output port 344. The stream 350 can be coupled to a pressure wash wand to direct the stream onto an object to be washed.

Ordinarily, a fluid pump 340 such as a pressure washer is not coupled to another pump, but is simply connected to a water supply using a hose. Water supplies vary widely in average pressure and instantaneous pressure, so that a particular pressure washer will operate with different efficiency and reliability depending on the quality and consistency of the water source. Indeed, if the water supply is excessively low in pressure, the pressure washer will run in a "starved" condition; the electric motor must work much harder to impel a low-pressure input stream than a higher-pressure input stream for a given output pressure. This generally increases current consumption and significantly shortens the life of the pump motor and internal components of the pump. Since high-quality pressure washers are quite expensive, early failure of the motor and/or pump can be catastrophic.

The way of controlling a pump described above overcomes these problems. By adjusting the regulator 310 to vary the output pressure of the second pump 320, the input stream 330 to the fluid pump 340 can be precisely controlled or "tuned," so that the pump 340 runs under optimum conditions. After the system is running and the pump 340 is generating a high-pressure stream 350, the operator can listen to noise made by the pump 340 and manually adjust or tune the regulator 310 to avoid starving the pump 340. An experienced operator can hear variations in the sound of the pump which indicate stress or non-optimum performance. The operator can also observe gauges showing the pressure in line 312 and line 330 and adjust the pressure in line 330 to a pressure recommended by the manufacturer of the pump 340.

Alternatively, to assist an operator in judging an optimum setting for the regulator 310, a pressure switch is placed in line 330. The pressure switch also protects the heater by shutting it off when insufficient water pressure is present. An electric lamp coupled to the switch glows when sufficient water pressure is present and the heater is on. The pressure switch is preset to turn on at a line pressure which is known to represent ideal input pressure for the fluid pump 340. In this arrangement, an operator can adjust the regulator 310 until the lamp glows. Thus, the lamp provides a visual indication that optimum input water pressure is being provided to the pump 340.

It should be appreciated that the components shown in FIGS. 1–7 may also operate according to the optimization scheme shown in FIG. 8 and described above. When the control valve 210 is in the wash position, an operator can adjust regulator 310 to provide optimum airflow to pump 104, which generates an output stream of water on line 105 at constant and reliable pressure. This stream feeds the pressure washer 86; thus, by adjusting regulator 310 an operator can quickly and precisely tune and optimize the performance of the pressure washer.

When objects to be washed in the washing apparatus are particularly soiled, the debris washed from the objects can include heavy particles such as, by way of example, metal shavings and rubber residue. The narrow gap that is provided on three sides of the subfloor placed in the washing apparatus, as described above with respect to FIG. 3, enables washing fluid and debris to flow into the tub. The debris can settle on the floor of the tub, as mentioned above with respect to FIG. 4. However, in one embodiment, debris filters or "gutters," which serve to capture at least some of the debris as it flows through the narrow gap on the sides of the subfloor, can be added to the washing apparatus.

Figure 9:
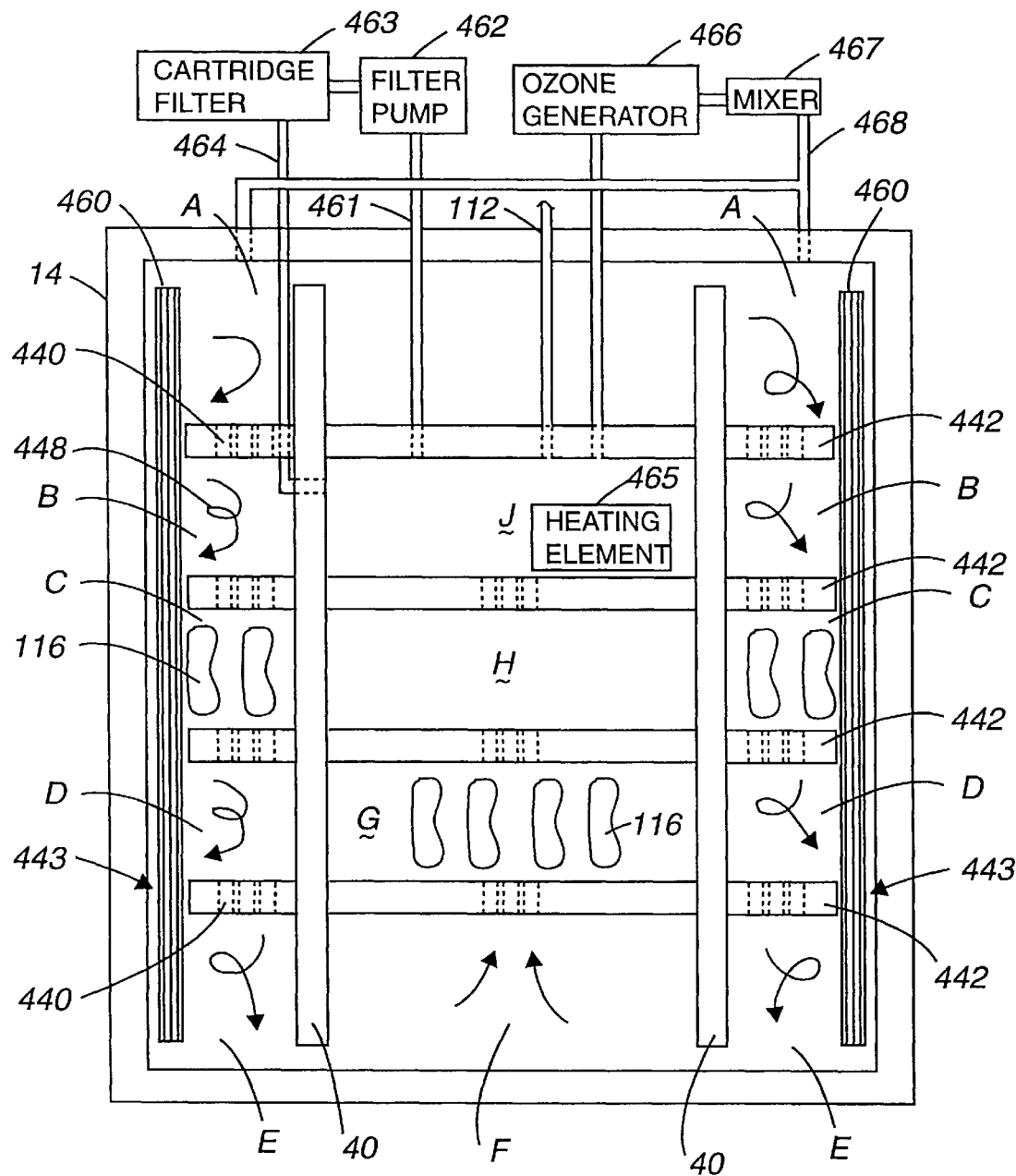
FIG. 9 is a top view of a beam arrangement in a washing apparatus with debris filters in accordance with an embodiment of the present invention.

FIG. 9 is a top view of a beam arrangement in a washing apparatus with debris filters in accordance with an embodiment of the present invention. Beams 40, 442 rest in tub 14, and fit snugly against one another to form a plurality of containment compartments A, B, C, D, E, F, G, H, and J, as described above. In the described embodiment, gaps in the subfloor are substantially eliminated, and openings 444 at the surface level of the water are provided in beams 442 to permit oil and other contaminants which rise to the surface of the water to flow between compartments A, B, C, D, E and F. In some embodiments, openings can be provided in beams 40, as well, to facilitate the passage of oil into compartment G, for example.

As previously discussed, when an object is being washed, runoff water and contaminants will initially enter compartments A, B, C, D, and E. The water then tends to swirl around, as shown by arrows, as for example arrow 448, until the water exits the compartments through gaps 443 at the ends of the beams 442. The flow of water is substantially the same as the flow described above with respect to FIG. 4. It should be appreciated, however, that as shown in FIG. 9, water is removed from compartment J through pipe 461, and is processed by a filter pump 462 and a cartridge filter 463, and clean water is piped through pipe 464 back into compartment J. Filter pump can 462 can be any suitable pump which is capable of generating an acceptable level of pressure, and is not necessarily a pneumatic pump. Compartment J can further includes a heating element 465 which can be used to substantially maintain a desired temperature level within compartment J. Also, an ozone generator 466 and a mixer 467 can be arranged to pump a mixture of gas and liquid through pipe 468 into compartment A. It should be appreciated that pipe 468 is split such that the mixture of gas and liquid pumped therethrough provides a substantially equivalent force load to compartment A on both sides of the washing apparatus.

In the described embodiment, absorbent socks 416 are located in compartments C and G, as due to the flow of water in tub 14, it has been observed that oil has the tendency to gather in compartments C and G. Hence, locating absorbent socks 416 in compartments C and G enables a substantial amount of oil to be absorbed from the surface of the water. It should be appreciated, however, that absorbent socks 416 can be located in any suitable compartment.

Although oil-water separators have not been included in the described embodiment, oil-water separators can be included as necessary. As previously described, oil-water separators allow oil and other contaminants to rise to the surface of the separators and discharge in one direction while enabling water to flow in another direction. For embodiments in which the flow of water in tub 14 alone is not sufficient to promote a separation between oil and water, oil-water separators can be included. By way of example, oil-water separators can be oriented in compartment G such that socks 116 located in compartment G can absorb oil discharged from the oil-water separators.

Debris filters 460 are located in gaps 443 to capture at least some of the heavier and larger particles, i.e., debris, that are present in the runoff water. In general, debris filters 460 are arranged such that water can flow through debris filters 460, while debris is captured by debris filters 460. Although debris filters 460 may take any suitable form, in the described embodiment, debris filters 460 are made from a metal mesh material, and are configured as elongated "V-shaped" pieces. Debris filters 460, as shown, are located such that at least some of the runoff water that flows over the sides of a subfloor (not shown) that is typically placed over beams 40, 442 runs through debris filters 460. By collecting debris in debris filters 460, the likelihood of heavy particles obstructing pipes, as for example inlet pipe 112, is reduced.

Figure 10:
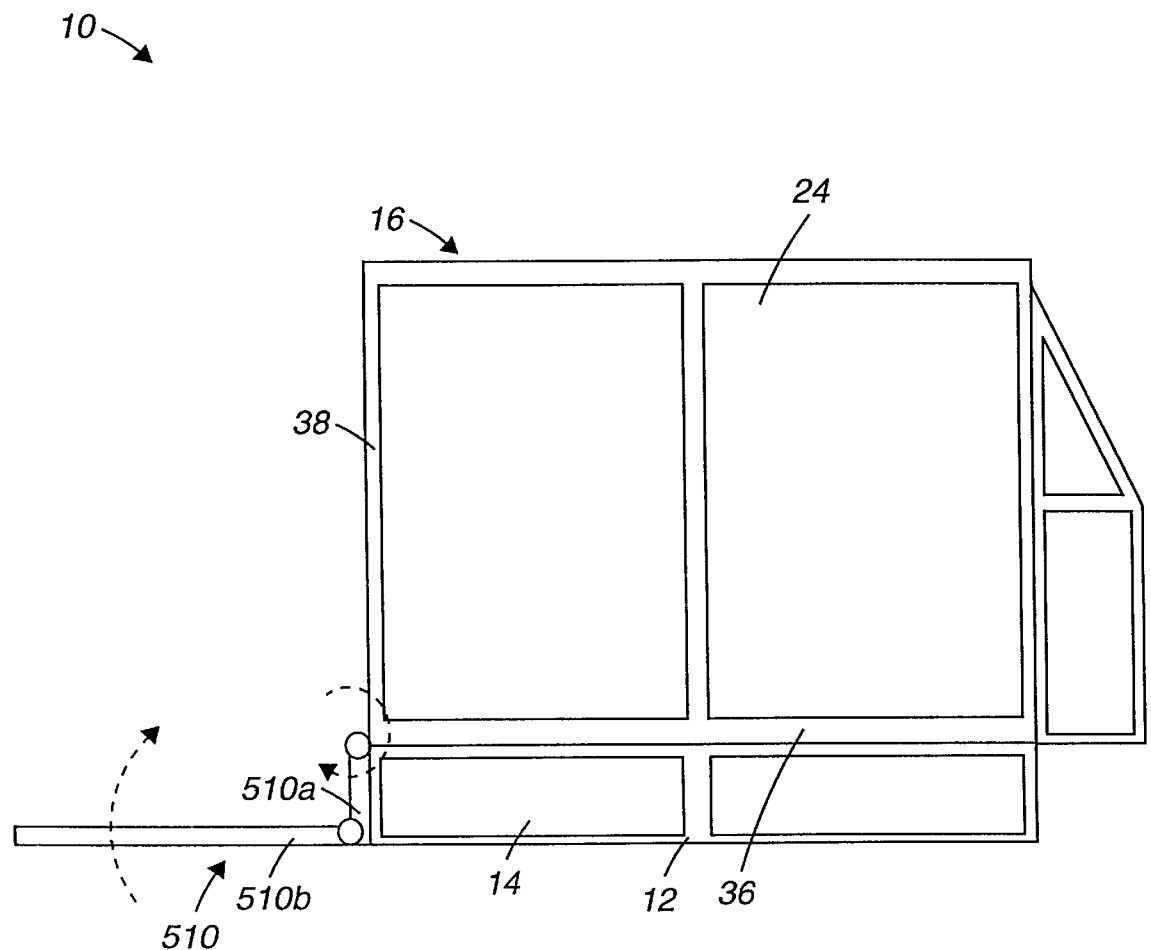
FIG. 10 is a side view of a washing apparatus with a ramp assembly in accordance with an embodiment of the present invention.

In general, the features of the washing apparatus described above can vary depending upon the requirements of a particular user. By way of example, the size of the overall washing apparatus can be increased or decreased to accommodate the size of objects which are to be washed using the apparatus. In addition, the individual components associated with the washing apparatus can also vary. For example, as mentioned above with respect to FIGS. 2 and 3, the ramp that is hinged to the base frame of the washing apparatus can take on various other configurations. With reference to FIG. 10, one alternate embodiment of a ramp will be described in accordance with the present invention.

As shown in FIG. 10, and also in FIGS. 11 through 15, a ramp assembly 510 is hinged to base frame 12 of washing apparatus 10 much in the same manner as described with respect to FIG. 2. Ramp assembly 510 includes a first portion 510a, which is hinged to base frame 12, and a second portion 510b. First portion 510a and second portion 510b are generally pivotably connected such that second portion 510b can be pivoted with respect to first portion 510a. As shown, first portion 510a and second portion 510b are coupled by a hinge mechanism 512 which enables second portion 510b to maintain a substantial contact with a ground surface, e.g., the ground surface on which washing apparatus 10 is placed.

In some embodiments, hinge mechanism 512 can include a locking mechanism which enables second portion 510b to lock to first portion 510a such that ramp assembly 510 can be configured as a ramp, i.e., such that ramp assembly 510 can be inclined as a ramp as shown in FIG. 2, to enable heavy objects to be readily moved into and out of washing apparatus 10. Ramp assembly 510 can be covered with a subfloor and a non-skid grating like those placed over the tub 14 as previously described.

It should be appreciated that in some embodiments, ramp assembly 510 can be moved upward, e.g., away from a ground surface, to rest against flanges (not shown) or similar structures that are coupled to wall frame 16. Latches (not shown) can also be coupled to wall frame 16 in order to lock ramp assembly 510 against wall frame 16 while an object is washed in washing apparatus 10.

Although the washing apparatus as described above serves the purpose of washing contaminated objects, in order to further facilitate the washing of objects, additional features may be included with the washing apparatus. By way of example, as the washing apparatus serves to wash contaminated objects, e.g., objects covered with oil or debris, washing agents, or water in general, and oil can splash out of the washing apparatus. In order to protect a user from being splashed with water, oil, and other assorted debris, a "splash protection guard" can be placed over the washing apparatus.

Figure 11:
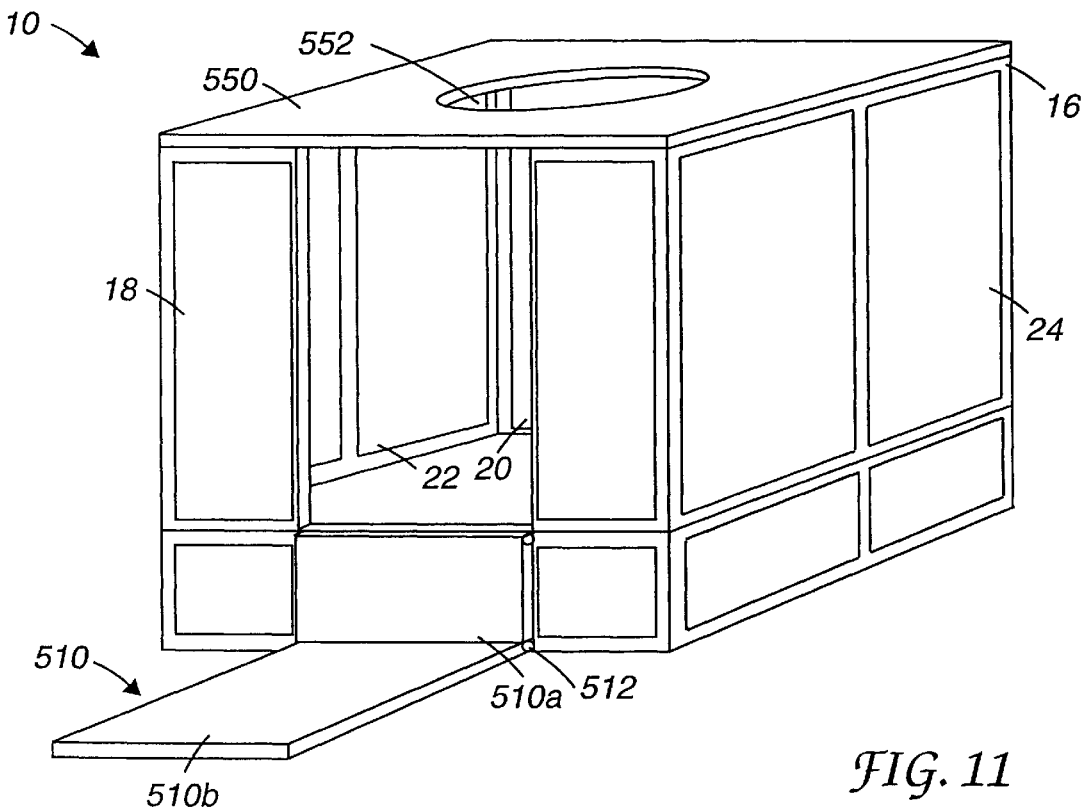
FIG. 11 is a perspective view of a washing apparatus with a splash protection cover in accordance with an embodiment of the present invention.

With reference to FIG. 11, one embodiment of a splash protection cover, or guard, will be described in accordance with the present invention. A splash protection cover 550 is placed over washing apparatus 10. Specifically, splash protection cover 550 is mounted on wall frame 16 over front wall 18, rear wall 20, left side wall 22, and right side wall 24 such that the enclosure fromed by walls 16, 18, 20, 22 is at least partially covered by splash protection cover 550. It should be appreciated that splash protection cover 550 can be mounted on wall frame 16 using any number of appropriate methods which include, but are not limited to, screw-down methods and lock-down methods.

Although splash protection cover 550 can be fabricated from any suitable material, materials which are lightweight, non-conductive, and water-resistant are preferred. By way of example, if it is desired for splash protection cover 550 to be substantially rigid, splash protection cover 550 can be formed from fiberglass or a composite material. Alternatively, if it is not desired for splash protection cover 550 to be rigid, splash protection cover 550 can be formed from nylon or PolyVinylChloride (PVC) which is reinforced with metal rods. Due to cost issues, PVC is preferred, although the use of nylon has also been shown to work well. As a user may find it desirable to be able to view the object which is being washed in washing apparatus 10, splash protection cover 550 may be forned from a transparent material such as plexiglass. It should be appreciated that splash protection cover 550 can also be formed as a structure. That is, splash protection cover 550 can be a cover assembly which includes, for example, various structural beams which strengthen splash protection cover 550.

As shown, splash protection cover 550 includes an opening 552 which is located approximately in the center of splash protection cover 550. It should be appreciated that both the size and the shape of opening 552, as well as the location of opening 552, may be widely varied. Through opening 552, a user can direct a stream of water, or any other suitable fluid, at an object (not shown) placed within washing apparatus 10. The amount of water that splashes off of the object and out of washing apparatus 10 is reduced, as at least some of the water that splashed off of the object is deflected by splash protection cover 550. Although a substantial amount of water can be prevented from splashing out of washing apparatus 10 with the use of splash protection cover 550, some water and, therefore, possibly oil and debris, is still likely to splash out of washing apparatus 10.

Figure 12A:
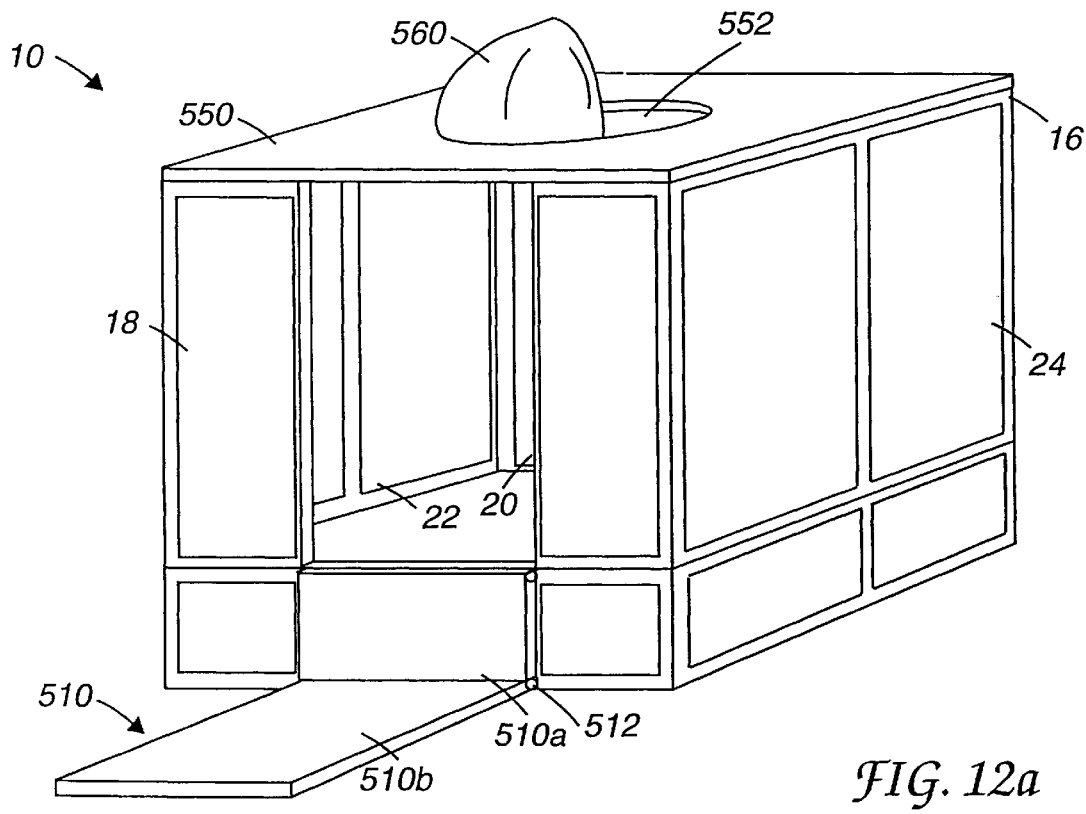
FIG. 12a is a perspective view of a washing apparatus with a splash protection cover and a deflection cap in accordance with an embodiment of the present invention.

Referring next to FIG. 12a, a "deflection cap," which can be used in conjunction with a splash protection cover, e.g., splash protection cover 550 of FIG. 11, will be described in accordance with an embodiment of the present invention. A deflection cap 560 can be mounted over opening 552 of splash protection cover 550. Deflection cap 560 serves to further prevent water from splashing out of washing apparatus 10 by deflecting water which splashes out of opening back into washing apparatus 10.

As shown, deflection cap 560 is configured as a portion of a dome, although deflection cap 560 can be of many other configurations, as long as a user is still able to direct a stream of water through opening 552. By way of example, deflection cap 560 can be of a polygonal shape. Deflection cap 560 can be made of the same material as splash protection cover 550, e.g., deflection cap can be made of fiberglass, a composite material, plexiglass, PVC, or nylon.

While deflection cap 560 can be rigidly secured to splash protection cover 550, in some embodiments, the ability to move deflection cap 560 with respect to opening 552 is desirable. For example, if it is required that an object that is being washed in washing apparatus 10 be directly washed on all sides, i.e., that water from a hose be directed at all sides of the object, then the ability to move deflection cap 560 such that the object is accessible on all sides would be desirable. In order to move deflection cap 560, splash protection cover 550 can be formed to enable deflection cap 560 to be screwed into splash protection cover 550 at different locations around opening 552. Alternatively, a sliding cage (not shown), or grid, can be added over opening 552 such that deflection cap 560 can be slidably moved to different locations over opening 552.

Figure 12B:
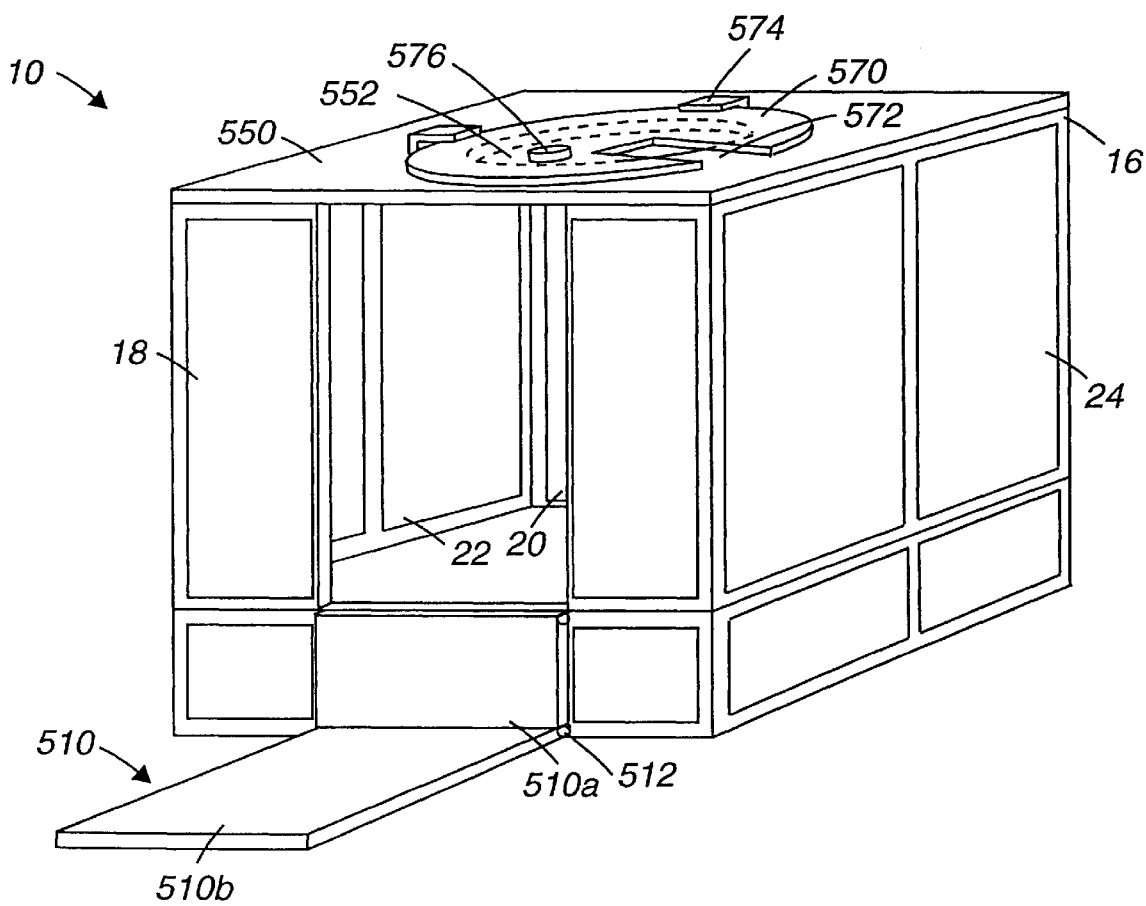
FIG. 12b is a perspective view of a washing apparatus with a splash protection cover and a cover overlay in accordance with an embodiment of the present invention.

With reference to FIG. 12b, a "cover overlay," which can be used in conjunction with the splash protection cover 550 of FIG. 11, will be described in accordance with an embodiment of the present invention. A cover overlay 570 is mounted such that cover overlay 570 substantially covers opening 552. In general, cover overlay 570 can be made of the same material as splash protection cover 550, e.g., deflection cap can be made of fiberglass, a composite material, plexiglass, PVC, or nylon.

An overlay opening 572 is included in cover overlay 570 such that when cover overlay 570 is mounted over opening 552, access to an object (not shown) that is placed within washing apparatus 10 is permitted. In other words, overlay opening 572 is arranged to permit water to flow therethrough, as well as through opening 552, to reach an object that is to be washed.

In the described embodiment, cover overlay 570 is mounted over opening 552 such that cover overlay 570 and, therefore, overlay opening 572, can rotate over opening 552. By enabling overlay opening 572 to be rationally moved over opening 552, access to different sides of an object within washing apparatus 10 can be achieved, while the amount of water splashing off the object and out of washing apparatus 10 can be reduced, as overlay opening 572 can be of a significantly smaller size than opening 552. It should be appreciated that the size and shape of overlay opening 572 can be widely varied. By way of example, although overlay opening 572 is shown as being of a substantially rectangular shape, overlay opening 572 can be of a circular shape.

To enable cover overlay 570 to rotate, cover overlay 570 is arranged to contact supports 574 such that cover overlay 570 is allowed to rotate without substantial lateral movement with respect to opening 570. In the described embodiment, a knob 576 is provided on cover overlay 570 to enable a user to rotate cover overlay 570. It should be appreciated, however, that other mechanisms, as for example a pulley system, can be implemented in lieu of knob 576 to enable a user to rotate cover overlay 570.

Supports 574 are generally mounted on splash protection cover 550. As shown, two supports are used essentially to substantially constrain the lateral movement of cover overlay 570. However, it should be appreciated that any number of supports 574, as for example three or four supports, can be used. Alternatively, a continuous track (not shown) can be included on splash protection cover 550 to enable cover overlay 570 to rotate without significantly sliding in a lateral direction.

Although the use of a splash protection cover, either alone or in conjunction with a deflection cap or a cover overlay, serves to significantly reduce the amount of water which splashes out of the washing apparatus, in some embodiments, the splash protection cover can inhibit a user from directing a stream of water at the sides of a large object, as the sides can be somewhat inaccessible through the splash protection cover. For example, cleaning relatively large objects can be difficult when the splash protection cover is in place. As such, it may be desirable for large objects to be cleaned with alternate forms of splash protection in place.

Figure 13:
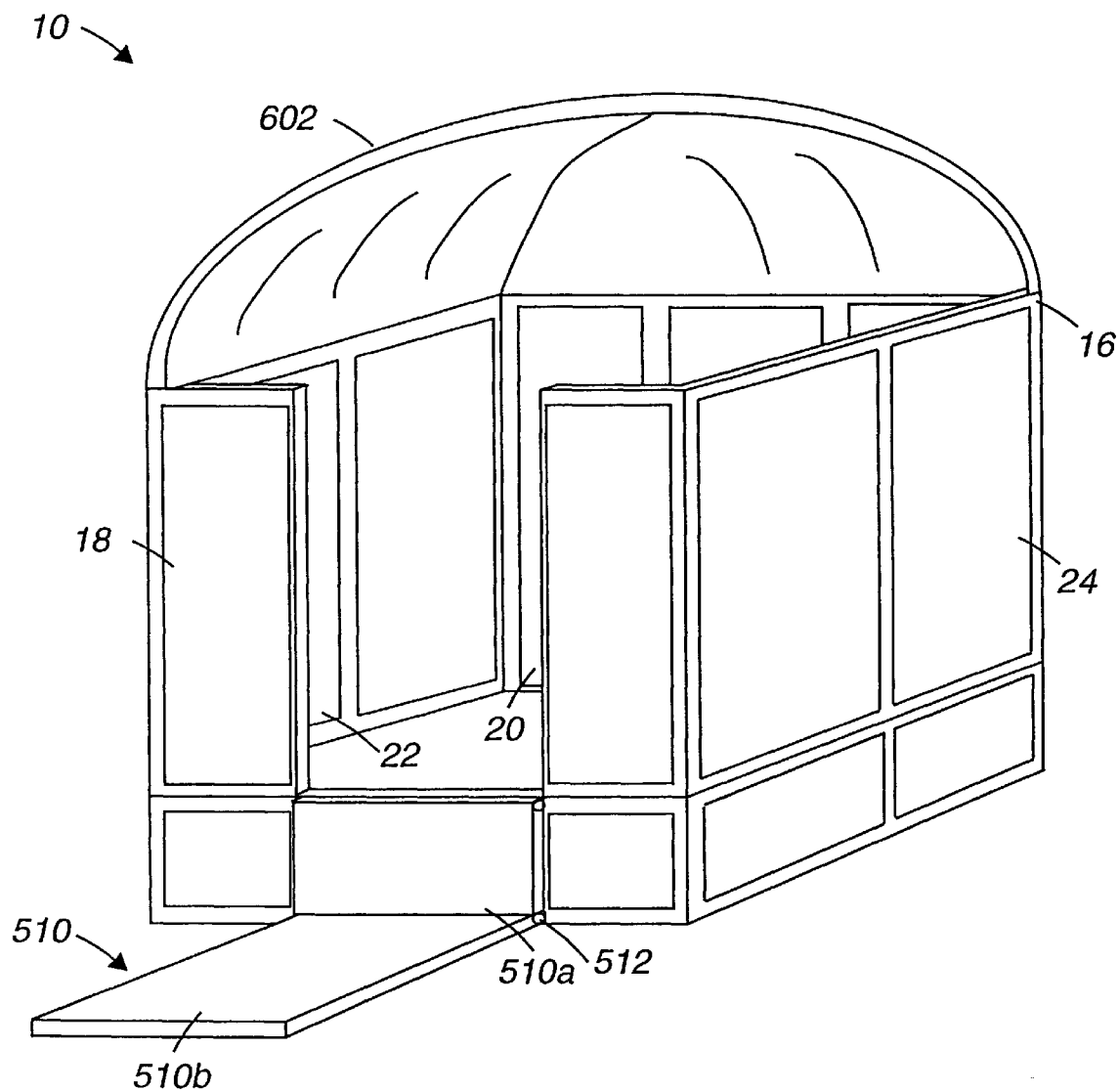
FIG. 13 is a perspective view of a washing apparatus with a splash protection shield in accordance with an embodiment of the present invention.

FIG. 13 is an illustration of a washing apparatus with a splash protection shield in accordance with an embodiment of the present invention. As shown, a splash protection shield 602 of a domed shape is mounted over left side wall 22 and rear wall 20 such that spash protection shield 602 covers, in the described embodiment, approximately half of washing apparatus 10. It should be appreciated that splash protection shield 602 can be mounted on any suitable portion of washing apparatus 10. Splash protection shield 602 serves to prevent water from splashing out of washing apparatus 10 by deflecting water back into washing apparatus 10. The use of splash protection shield 602, in lieu of a splash protection cover as described above with respect to FIG. 11, enables a user to more readily access an object (not shown) placed within washing apparatus 10.

Splash protection shield 602 can be configured to extend to any suitable distance above washing apparatus 10. Similarly, the size and the shape of splash protection shield 602, as well as materials used to fabricate splash protection shield 602, can also vary. By way of example, splash protection shield 602 can be formed from non-conductive, lightweight, water-resistant, rigid materials, e.g., fiberglass or composite materials including various types of plastics. Alternatively, if the rigidity of splash protection shield 602 is not an issue, splash protection shield 602 can be formed from a material such as nylon, and reinforced with metal bars such that the nylon can maintain a desired shape, e.g., a domed shape. In other words, nylon can be "tented" over washing apparatus 10.

Figure 14:
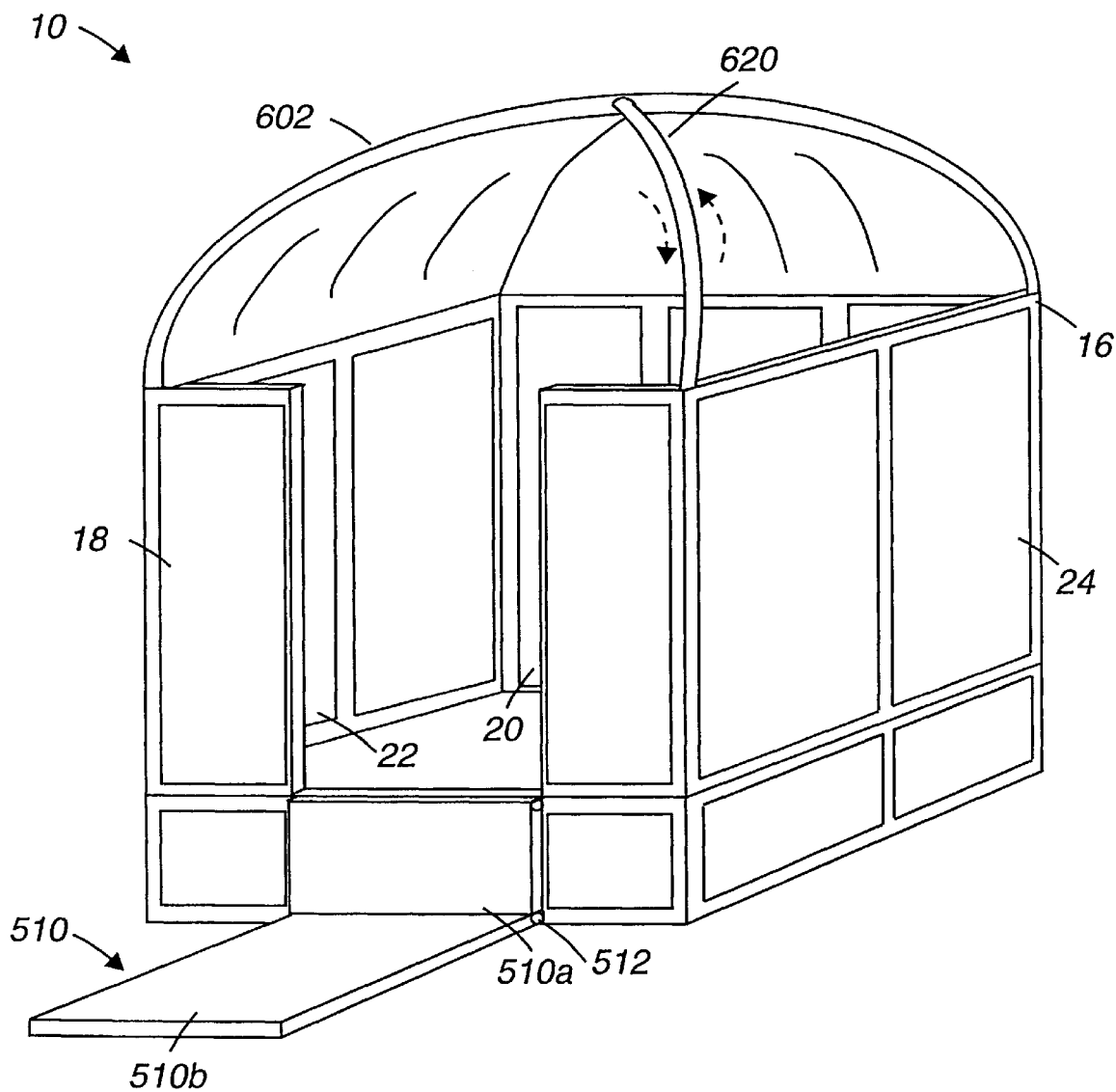
FIG. 14 is a perspective view of a washing apparatus with a splash protection shield mounted on a cage in accordance with an embodiment of the present invention.

In some embodiments, splash protection shield 602 is mounted such that splash protection shield 602 can be readily relocated with respect to washing apparatus 10. By way of example, in one embodiment, splash protection shield 602 can be slidably mounted, e.g., splash protection shield 602 can be mounted on a grid, or cage, to facilitate changing the location of splash protection shield 602 with respect to washing apparatus 10, as shown in FIG. 14. A grid 620 is mounted on wall frame 16, and splash protection shield 602 is located around grid 602. In other words, as shown, grid 602 runs through splash protection shield 602 such that the surface of grid 602, together with the sides of a thru-hole (not shown) that runs through splash protection shield 602, forms a sliding interface. As such, splash protection shield 602 can slide over grid 602 to cover different portions of washing apparatus 10. It should be appreciated that locks can also be included to secure splash protection shield 602 at various locations along grid 602.

Figure 15:
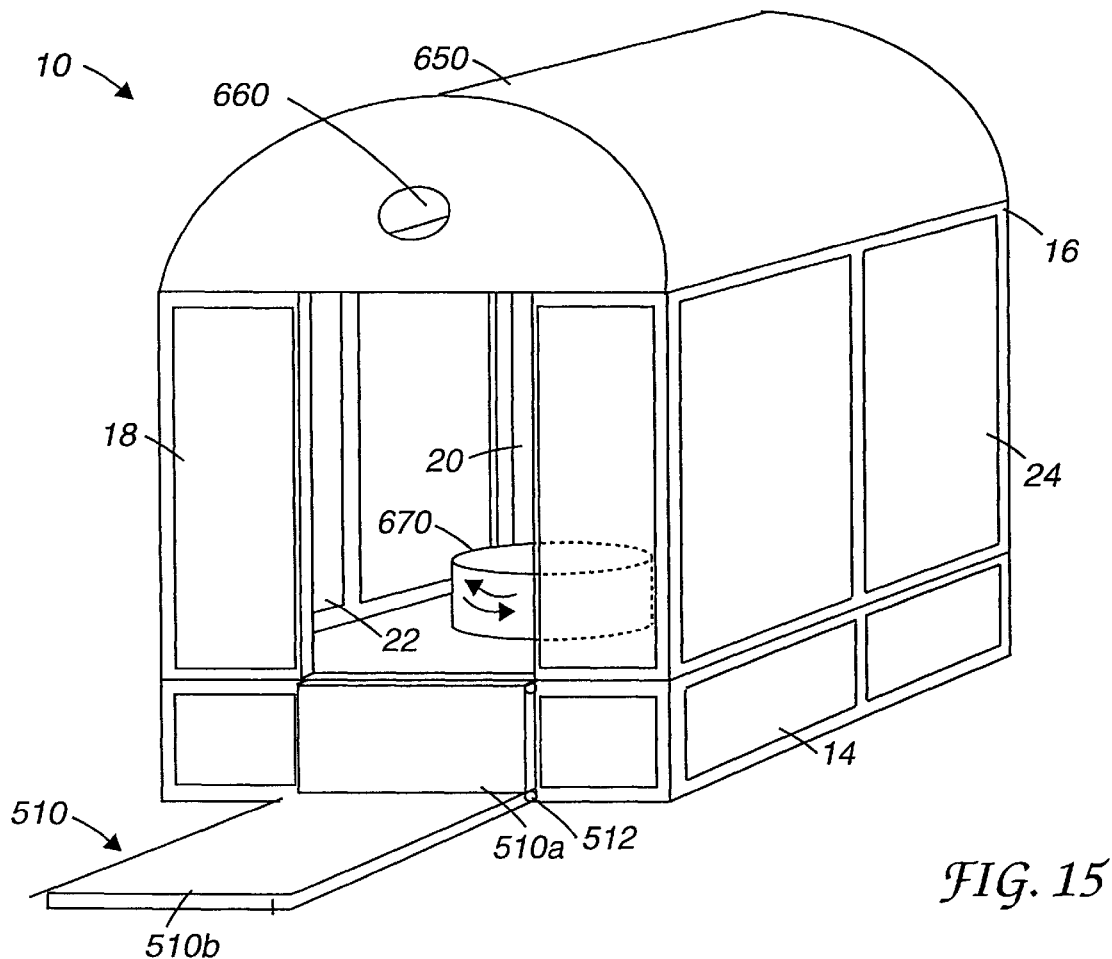
FIG. 15 is a perspective view of a washing apparatus with a splash protection cap and a turntable in accordance with an embodiment of the present invention.

A splash protection shield can be expanded to form a full splash protection cap which almost completely covers washing apparatus 10. With reference to FIG. 15, such a full splash protection cap, which can serve to virtually eliminate any splashing of water outside of washing apparatus 10, will be described in accordance with an embodiment of the present invention. A splash protection cap 650 is mounted on washing apparatus 10 such that the enclosure formed by front wall 18, right side wall 24, rear wall 20, and left side wall 22 is substantially covered.

Like the splash protection cover and the splash protection shield that were previously described, splash protection cap 650 can be made from any appropriate material, e.g., any non-conductive, lightweight, water-resistant material. In general, appropriate materials will either be materials which are substantially rigid, or materials which can be held in place by a supporting structure that is mounted to washing apparatus 10. In some embodiments, splash protection cap 650 is made from a semi-transparent material, as for example, plastic, which enables an object (not shown) placed within washing apparatus 10 to be viewed through splash protection cap 650.

While splash protection cap 650 is shown as being of a curved shape, it should be appreciated that splash protection cap 650 can take any suitable size or shape. By way of example, slash protection cap 650 can be of a pyramidal shape. Alternatively, splash protection cap 650 can also be of a hemispherical shape.

An opening 660, through which water can be directed, is included in splash protection cap 650. It should be appreciated that the size of opening 660 can be widely varied, and is dependent, at least in part, upon the size and pressure of the water spray, e.g., stream of water, that is to be used in conjunction with washing apparatus 10. As splash protection cap 650 is arranged such that the enclosure formed by walls 18, 20, 22, 24 is substantially covered, the inclusion of opening 660 facilitates the cleaning of an object (not shown) that is placed in washing apparatus 10. Water can directed through opening 660 at an object that is to be cleaned.

The ability to access different sides of the object to be cleaned through opening 660 can be difficult, especially if an object is relatively large, as previously mentioned with respect to FIGS. 11 and 12. In other words, directing ajet of water such that the water reaches the side of the object that is furthest from opening 660, thereby enabling that side of the object to be cleaned, can prove to be difficult. As such, adding a rotational device or platform, as for example a turntable 670, on which the object to be cleaned can be positioned, enables the object to be turned and, therefore, washed on all sides.

Turntable 670 is generally positioned to enable an object, which is loaded into washing apparatus 10 via ramp assembly 510 or any other suitable mechanism, to be laced atop turntable 670. Accordingly, turntable 670 can be of any suitable size or shape, depending upon the size and the shape, as well as the weight, of objects which are to be placed on turntable 670. Turntable 670 can also be made of any suitable material. Preferably, materials from which turntable 670 is fabricated are waterresistant and non-corrosive. In one embodiment, turntable 670 includes latching devices (not shown) which are used to secure an object in place with respect to turntable 670, once the object is placed on turntable 670. Such latching devices can include, but are not limited to, straps which can be used to tie down the object.

As shown, turntable 670 located over subfloor 50. It should be appreciated that due to the fact that subfloor 50 is typically removable, turntable 670 can be positioned so that subfloor 50 can be placed around turntable 670. Alternatively, turntable 670 can be removable, i.e., turntable 670 can be placed after subfloor 50 is placed. In some embodiments, turntable 670 can be supported by tub 14. In other embodiments, turntable 670 can be supported by wall frame 16, horizontal beams 36, or vertical posts 38.

Turntable 670 can be made to rotate using any one of a number of different apparatuses. By way of example, turntable 670 can be powered by a rotational motor (not shown) that can be controlled from the control panel described above with respect to FIG. 2. Such a rotational motor can be a direct drive motor which is directly coupled to turntable 670. Alternatively, rotational motor can be coupled to a system of pulleys which cause turntable 670 to rotate.

Figure 16:
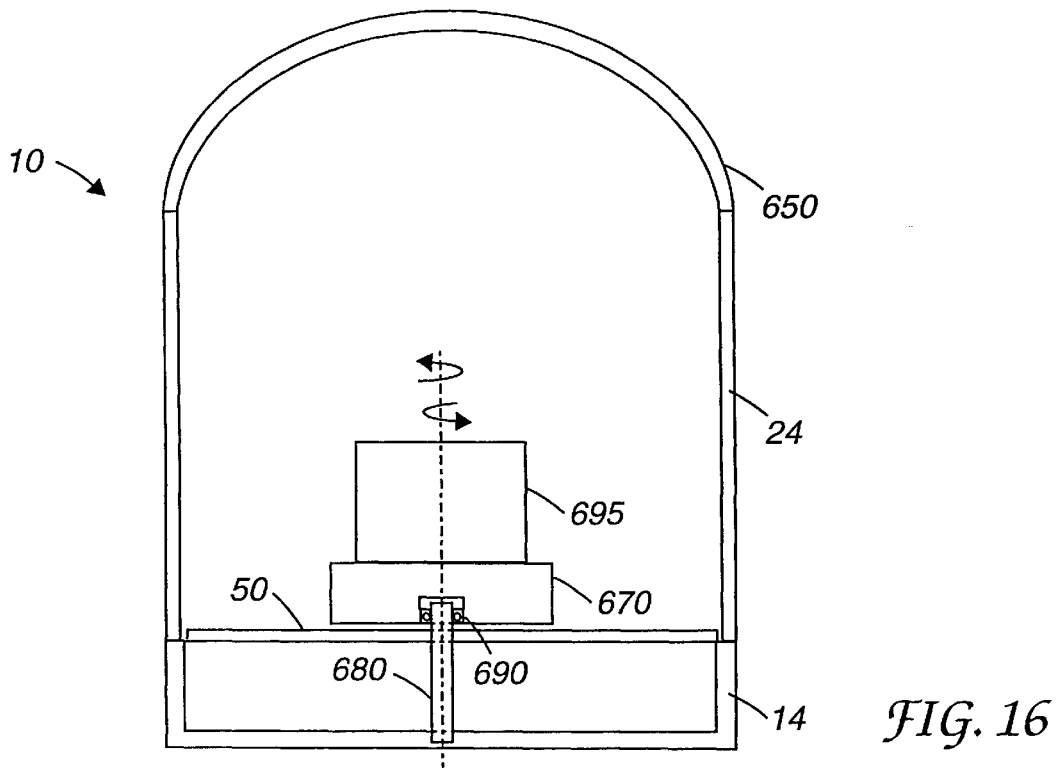
FIG. 16 is a cross-sectional view of the washing apparatus of FIG. 15 in accordance with an embodiment of the present invention.

Another apparatus which can be used to cause turntable 670 to rotate in accordance with an embodiment of the present invention will be described with respect to FIG. 16, which is a cross-sectional view of washing apparatus 10 as shown in FIG.15. FIG. 16 shows turntable 670 coupled to a shaft 680 that runs through turntable 670, and is coupled to tub 14. It should be appreciated that beams which are present in tub 14 have not been shown purely for ease of illustration. In the described embodiment, a bearing 690 holds shaft 680 in place with respect to turntable 670, and enables turntable 670 to rotate.

The pressure of the water that is used to wash an object 695 mounted on turntable 670 is typically high enough to generate significant forces on object 695. As object 695 is mounted on turntable 670, which is free to rotate, when the forces generated by the water against object 695 are high enough, the forces can cause turntable 670 to rotate, as will be appreciated by those skilled in the art. This rotation of turntable 670 generally serves to enable all sides of object 695 to be washed, without the use of a motor to rotate turntable 670. It should be appreciated that the forces required to produce the rotation of turntable 670 are dependent upon factors which include, but are not limited to, the size and the weight of object 695.

Instead of splash protection shields and splash protection covers, the amount of water which splashes out of a washing apparatus can be reduced by essentially adding more height to the walls of the washing apparatus. While the overall dimensions of the washing apparatus can be changed to raise the height of the walls, in one embodiment, splash protection walls can be added.

Figure 17:
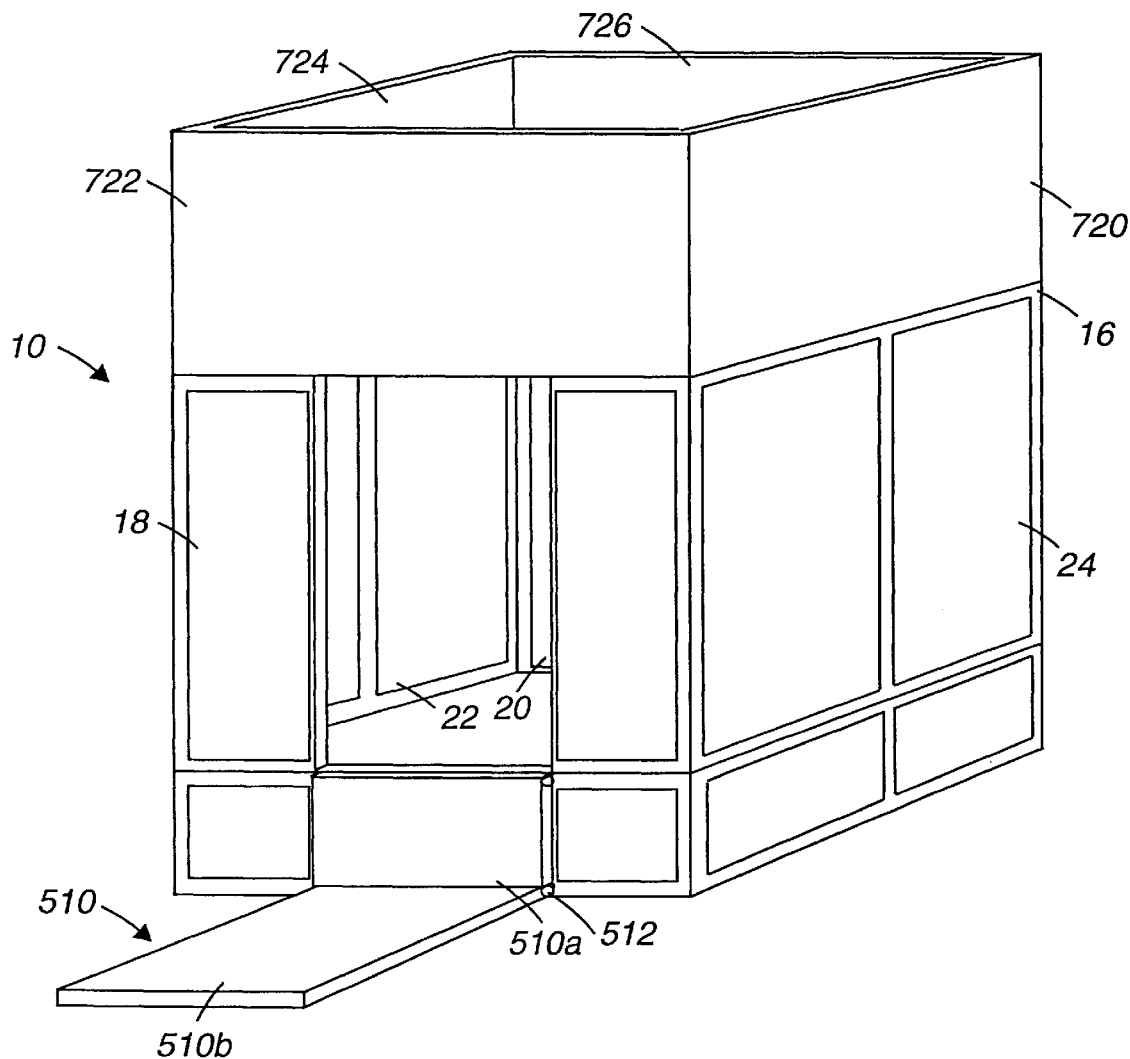
FIG. 17 is a perspective view of a washing apparatus with splash protection walls in accordance with an embodiment of the present invention.

With reference to FIG. 17, splash protection walls will be described in accordance with one embodiment of the present invention. Splash protection walls 720, 722, 724, 726, which may be made of any suitable material, as for example sheet metal, are added over frame 16 of washing apparatus 10 to effectively increase the height of washing apparatus 10. Although splash protection walls 720, 722, 724, 726 can be of any suitable height, heights in the range of approximately two to five feet, as for example three feet, are preferred. The increased height added by splash protection walls 720, 722, 724, 726 reduces the amount of water, which is used to wash an object (not shown) that is placed in washing apparatus 10, that splashes out of washing apparatus 10, due to the fact that a significant amount of the splashed water deflects off of splash protection walls 720, 722, 724, 726.

Although only a few embodiments of the present invention have been described, it should be understood that the present invention may be embodied in many other specific forms without departing from the spirit or scope of the invention. By way of example, any suitable mechanism can be used in lieu of absorbent socks for absorbing oil. Further, the locations of these mechanisms, as well as the location of absorbent socks can be widely varied. Similarly, the location of oil-water separators can also be varied. It should be appreciated that in addition to varying the location of oil-water separators, the use of oil-water separators can also be eliminated without departing from the spirit or the scope of the present invention.

Although a ramp has been included as a part of the washing apparatus, it should be appreciated that a separate ramp, or a ramp that is not part of the washing apparatus, can instead be used to move objects into and out of the washing apparatus. By way of example, the washing apparatus can include a door, e.g., gate, through which objects can be moved. An external ramp, or a forklift device, can then be used to facilitate the movement of objects through such a door on the washing apparatus.

While a turntable, on which an object to be cleaned can be situated, has been described as being suitable for use with a washing apparatus that includes a splash protection cap, a turntable is also well-suited for use with a washing apparatus that either includes any type of splash protection guard, or no splash protection guard at all. As a turntable serves to rotate an object while the object is being cleaned, the inclusion of a turntable can serve to improve the cleaning process in many cases.

A splash protection cover, as well as a splash protection shield, can be fixably mounted on a washing apparatus. In other words, the splash protection cover and the splash protection shield can be mounted using screws and locks, for example. Alternatively, the splash protection cover and the splash protection shield can be mounted using a suspension system which enables the splash protection cover and the splash protection shield to be pivotably moved with respect to the washing apparatus, e.g., the splash protection cover and the splash protection shield can be hinged to the washing apparatus.

The dimensions of the washing apparatus and features thereof can also be widely varied without departing from the spirit or the scope of the present invention. By way of example, if objects to be washed have dimensions that are larger than the dimensions of the washing apparatus described above, the dimensions of the washing apparatus can be modified to accommodate the objects. Similarly, the dimensions of the washing apparatus can also be modified to accommodate small objects. Therefore, the present examples are to be considered as illustrative and not restrictive, and the invention is not to be limited to the details given herein, but may be modified within the scope of the appended claims.

What is claimed is:

1. An apparatus for pressure washing a mechanical part having a contaminant and for recovering the contaminant, the apparatus comprising:
   a supporting mechanism arranged to support the mechanical part while a washing agent is flowed over the mechanical part to remove the contaminant;
   an arrangement at least partially located below the supporting mechanism, the arrangement being arranged to receive the washing agent and the contaminant removed from the mechanical part;
   an ozone generator;
   a mixing mechanism in communication with the ozone generator, wherein the mixing mechanism is arranged to inject ozone into the washing agent; and
   a pump arranged to draw the washing agent from a first inlet to the arrangement, the pump further being arranged to force the washing agent through the mixing mechanism.

2. An apparatus according to claim 1 further including a flowing mechanism, wherein the flowing mechanism is arranged to flow the washing agent over the mechanical part to remove the contaminant.

3. An apparatus according to claim 2 wherein the arrangement is further arranged to substantially separate the contaminant from the washing agent, and the flowing mechanism is arranged to draw the washing agent from the arrangement to form a substantially closed loop.

4. An apparatus according to claim 1 wherein the receptacle arrangement includes a plurality of walls, the walls being arranged to define a circulation path, the circulation path being at least partially defined within the receptacle arrangement.

5. An apparatus according to claim 4 wherein the apparatus further includes a contaminant isolator positioned in the circulation path, wherein the contaminant isolator is arranged to isolate the contaminant from the washing agent.

6. An apparatus according to claim 1 further including a filtering arrangement, the filtering arrangement being arranged substantially below the mechanical part.

7. An apparatus according to claim 6 wherein the mechanical part further includes particles which are washed off the mechanical part while the washing agent is flowed over the mechanical part, and the filtering arrangement is a particulate filtering mechanism arranged to filter the particles from the washing agent.

8. An apparatus according to claim 6 wherein the mechanical part includes debris that is arranged to be removed while the washing agent is flowed over the mechanical part, and the filtering arrangement is arranged to collect the debris.

9. An apparatus for washing an engine part having a contaminant and for recovering the contaminant, the apparatus comprising:
   a supporting mechanism arranged to support the engine part while a washing agent is flowed over the engine part to remove the contaminant;
   a fluid receiver, the fluid receiver being arranged to receive the washing agent flowed over the engine part and the contaminant removed from the engine part;
   a filtering system, the filtering system being in fluid communication with the fluid receiver, wherein the filtering system is arranged to substantially separate the contaminant from the washing agent; and
   an ozone injecting system, the ozone injecting system being arranged to inject ozone into the washing agent received in the fluid receiver, to draw the washing agent from a first inlet to the fluid receiver, to force the washing agent through the ozone injecting system, and to return the washing agent to the fluid receiver through a first outlet.

10. An apparatus according to claim 9 further including a flowing mechanism arranged to flow the washing agent over the engine part to remove the contaminant, the flowing mechanism further being arranged to draw the washing agent form the filtering system.

11. An apparatus according to claim 9 wherein the filtering arrangement is arranged at least partially within the fluid receiver.

12. An apparatus according to claim 11 wherein the engine part further includes particles which are washed off the engine part while the washing agent is flowed over the engine part, and the filtering arrangement includes a particulate filtering mechanism arranged to filter the particles from the washing agent before the washing agent enters the fluid receiver.

13. An apparatus according to claim 11 wherein the engine part includes debris that is arranged to be removed from the engine part while the washing agent is flowed over the engine part, and the filtering system is arranged to collect the debris.

14. An apparatus according to claim 9 wherein the ozone injecting system includes:
   an ozone generator; and
   a venturi-type injector, the venturi-type injector being arranged to inject the ozone into the washing agent.

15. An apparatus for washing an object that is at least comparable in size to an automobile engine, the object having a contaminant, the apparatus being arranged to remove the contaminant from the object during washing, the apparatus comprising:
   a supporting mechanism that is sized to support the object that is at least comparable in size to an automobile engine while a washing agent is flowed over the object to remove the contaminant;
   a fluid receiving unit, the fluid receiving unit including at least one section that is arranged underneath the object, the at least one section being arranged to receive the washing agent flowed over the object and the contaminant removed from the object, wherein the fluid receiving unit is arranged to process the washing agent to substantially separate the contaminant from the washing agent received in the fluid receiving unit; and
   an ozone injecting arrangement, the ozone injecting arrangement being arranged to inject ozone into the washing agent received in the at least one section, to draw the washing agent from a first inlet to the fluid receiving unit, and to force the washing agent through the ozone injecting arrangement.

16. An apparatus according to claim 15 further including a filtering arrangement, the filtering arrangement being arranged at least partially within the fluid receiver.

17. An apparatus according to claim 16 wherein the object further includes particles which are washed off the object while the washing agent is flowed over the object, and the filtering arrangement is a particulate filtering mechanism arranged to filter the particles from the washing agent.

18. An apparatus according to claim 16 wherein the object includes debris that is arranged to be removed from the object while the washing agent is flowed over the object, and the filtering arrangement is arranged to collect the debris.

19. An apparatus according to claim 15 further including a flowing mechanism arranged to flow the washing agent over the object to remove the contaminant, the flowing mechanism further being arranged to draw the washing agent from the fluid receiver.

20. An apparatus according to claim 15 wherein the supporting mechanism is arranged such that the object is positioned atop the supporting mechanism.

21. A pressure washing apparatus, the pressure washing apparatus being arranged to wash an object with a contaminant, the pressure washing apparatus comprising:
   a surface arranged to support the object;
   a receptacle, the receptacle being arranged to receive a washing agent flowed over the object to remove the contaminant from the object, wherein at least some of the washing agent flowed over the object is drawn through a first outlet of the receptacle to thereby recirculate the washing agent;
   a filter, the filter being arranged to separate the washing agent from the contaminant; and
   an ozone injecting system, the ozone injecting system being arranged to inject ozone into the washing agent.

22. A pressure washing apparatus according to claim 21 wherein the pressure washing apparatus is portable.

23. A pressure washing apparatus according to claim 21 further including a flowing mechanism, the flowing mechanism being arranged to flow the washing agent over the object to remove the contaminant, wherein the flowing mechanism is further arranged to draw the washing agent from the first outlet of the receptacle.

24. A pressure washing apparatus according to claim 21 wherein the ozone injecting system further includes a mixer and a pump, the mixer being arranged to mix the ozone and the washing agent, the pump being arranged to force the washing agent through the mixer.

25. A pressure washing apparatus according to claim 24 wherein the ozone injecting system further includes:
   an ozone generator, the ozone generator being arranged to expose oxygen to radiation to generate ozone; and
   a venturi-type injector, the venturi-type injector being arranged to inject the ozone into the washing agent.

26. A pressure washing apparatus for washing an object with a contaminant, the pressure washing apparatus comprising:
   a fluid receiver, the fluid receiver being arranged to receive a washing agent flowed over the object to remove the contaminant from the object;
   a filtering system, the filtering system being arranged to separate the washing agent flowed over the object and the contaminant, the filtering system further being arranged to provide the washing agent to a first outlet associated with the filtering system; and
   an ozone injecting system, the ozone injecting system being arranged to inject ozone into the washing agent received in the fluid receiving arrangement.

27. A pressure washing apparatus according to claim 26 wherein the pressure washing apparatus is portable.

28. A pressure washing apparatus according to claim 27 further including a flowing mechanism, the flowing mechanism being arranged to flow the washing agent over the object to remove the contaminant, wherein the flowing mechanism is further arranged to draw the washing agent from the first outlet to form a substantially closed loop.

29. A recycling pressure washer system comprising:
   a floor sized and arranged suitably to support an industrial or mechanical object while a washing agent is flowed over the object to remove contaminants on the object;
   a pressure washer system having a pressurizing pump and a wand in communication with the pressurizing pump for flowing a pressurized washing agent over the object to remove the contaminants from the object;
   a basin located below the floor, the basin being arranged to collect the washing agent and the contaminants removed from the object;
   a filter system arranged to filter washing agent recycled from the basin, and to provide the filtered washing agent to the pressurizing pump;
   an ozone generator for generating ozone; and
   a mixer for mixing the ozone with the washing agent.

30. A recycling pressure washer system as recited in claim 29, wherein the pressure washer system is portable.

31. A portable recycling pressure washer system as recited in claim 30 wherein all of the components are integrated into a single unit.

32. A portable recycling pressure washer system as recited in claim 30, wherein the floor is sized suitably to support objects that are at least the size of an automotive engine.

33. A recycling pressure washer system according to claim 29 wherein the mixer is arranged for the washing agent to flow therethrough, and wherein ozone is mixed with the washing agent when pressure in the mixer is at a given level.

34. A pressure washing apparatus according to claim 21 wherein the ozone injecting system is arranged to inject ozone into the washing agent when washing agent flowing through the ozone injecting system causes a pressure level within the ozone injecting system to reach a threshold level.

35. A self-contained portable recycling pressure washing system, the self-contained portable recycling pressure washing system comprising:
- a floor suitable for supporting an object that is to be pressure washed;
- a pressure washing apparatus suitable for flowing a washing agent over the object in a pressurized stream;
- a basin mounted below the floor for collecting washing agent that is flowed over the object;
- a filter arrangement for filtering the washing agent collected by the basin, wherein filtered washing agent is recirculated to the pressure washing apparatus; and
- an ozone injecting arrangement for injecting ozone into the filtered washing agent.

36. A recycling pressure washing system, the recycling pressure washing system comprising:
- a floor suitable for supporting an object to be pressure washed, wherein the floor is sized suitably for receiving objects at least as large as an automotive engine;
- a pressure washing apparatus suitable for flowing a washing agent over the object in a pressurized stream;
- a basin mounted below the floor for collecting washing agent that is flowed over the object, wherein the floor and the basin are part of a transportable unit;
- a filter arrangement for filtering the washing agent collected by the basin, wherein the pressure washing apparatus is arranged to recirculate the filtered washing agent; and
- an ozone mixing arrangement for mixing ozone into the filtered washing agent.

37. A transportable recycling containment system for use with a pressure washer comprising:
- a floor suitable for supporting an object to be pressure washed, wherein the floor is sized suitable for receiving objects at least as large as an automotive engine;
- a basin mounted below the floor for collecting a washing agent that is flowed over the object, wherein the floor and the basin are part of a transportable unit;
- a filter arrangement for filtering the washing agent collected by the basin to provide a recirculated source of washing agent for the pressure washer, wherein the transportable recycling containment system is arranged to facilitate recirculation of the filtered washing agent to the pressure washer; and
- an ozone mixing arrangement for mixing ozone into the filtered washing agent.

* * * * *